US010168968B2

(12) United States Patent
Sone

(10) Patent No.: US 10,168,968 B2
(45) Date of Patent: *Jan. 1, 2019

(54) COMMUNICATION SYSTEM TO PERFORM DATA COMMUNICATION BETWEEN AN IMAGE FORMING APPARATUS AND A SERVICE PROVIDING APPARATUS

(71) Applicant: BROTHER KOGYO KABUSHIKI KAISHA, Nagoya-shi, Aichi-ken (JP)

(72) Inventor: Tatsuhiko Sone, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/654,157

(22) Filed: Jul. 19, 2017

(65) Prior Publication Data

US 2018/0004464 A1  Jan. 4, 2018

Related U.S. Application Data

(63) Continuation of application No. 15/168,329, filed on May 31, 2016, now Pat. No. 9,733,875.

(30) Foreign Application Priority Data

Jun. 30, 2015  (JP) .................................. 2015-131754

(51) Int. Cl.
*G06F 3/12* (2006.01)
*H04N 1/00* (2006.01)
*G06K 15/00* (2006.01)

(52) U.S. Cl.
CPC .......... *G06F 3/1238* (2013.01); *G06F 3/1222* (2013.01); *G06F 3/1236* (2013.01);
(Continued)

(58) Field of Classification Search
CPC ...... G06F 3/608; G06F 3/1204; G06F 3/1206; G06F 3/1225; G06F 3/1228;
(Continued)

(56) References Cited

U.S. PATENT DOCUMENTS 8,314,963 B2    11/2012  Park
8,855,557 B2 *  10/2014  Moosavi .................. H04B 5/00
                                                                455/41.1
(Continued)

FOREIGN PATENT DOCUMENTS

JP    2004-295888 A    10/2004
JP    2013-522774 A     6/2013

OTHER PUBLICATIONS

Notice of Allowance dated Apr. 4, 2017 from parent U.S. Appl. No. 15/168,329.

*Primary Examiner* — Gabriel Garcia
(74) *Attorney, Agent, or Firm* — Scully, Scott, Murphy & Presser, PC

(57) ABSTRACT

In response to receiving an instruction operation in a receiving process, a processor executes an apparatus-side preparing process including an issuance requesting process of transmitting issuance requesting information to a server through a communicator, the issuance requesting information being information for requesting issuance of authentication information indicative of authority to perform data communication with a service providing apparatus, the instruction operation being a user operation of instructing execution of a preparing process for connecting the image forming apparatus to the service providing apparatus, a storage-instruction receiving process of receiving storage instructing information from the server through the communicator, the storage instructing information being information including the authentication information issued by the service providing apparatus, and a first near-field transmitting process of, in response to approach of the card to the first near-field communicator, transmitting the authentication information included in the storage instructing information to a card through a near-field communicator.

23 Claims, 14 Drawing Sheets

(52) U.S. Cl.
CPC ....... *G06F 3/1292* (2013.01); *H04N 1/00127* (2013.01); *G06K 15/4095* (2013.01)

(58) Field of Classification Search
CPC .... G06F 3/1238; G06F 3/1222; G06F 3/1288; G06F 3/1292; G06K 15/4095
USPC ........ 358/1.1–1.18, 402, 448; 709/203, 223; 382/139
See application file for complete search history.

(56) References Cited

U.S. PATENT DOCUMENTS

| | | |
|---|---|---|
| 9,164,711 B2 | 10/2015 | Mori |
| 9,733,875 B2 * | 8/2017 | Sone ................... G06F 3/1238 |
| 9,813,590 B2 * | 11/2017 | Ishibashi .............. H04N 1/4433 |
| 2004/0190038 A1 | 9/2004 | Shahindoust |
| 2011/0235085 A1 | 9/2011 | Jazayeri et al. |
| 2011/0299110 A1 | 12/2011 | Jazayeri et al. |
| 2012/0057193 A1 | 3/2012 | Jazayeri et al. |
| 2012/0136634 A1 | 5/2012 | Yamade |

* cited by examiner

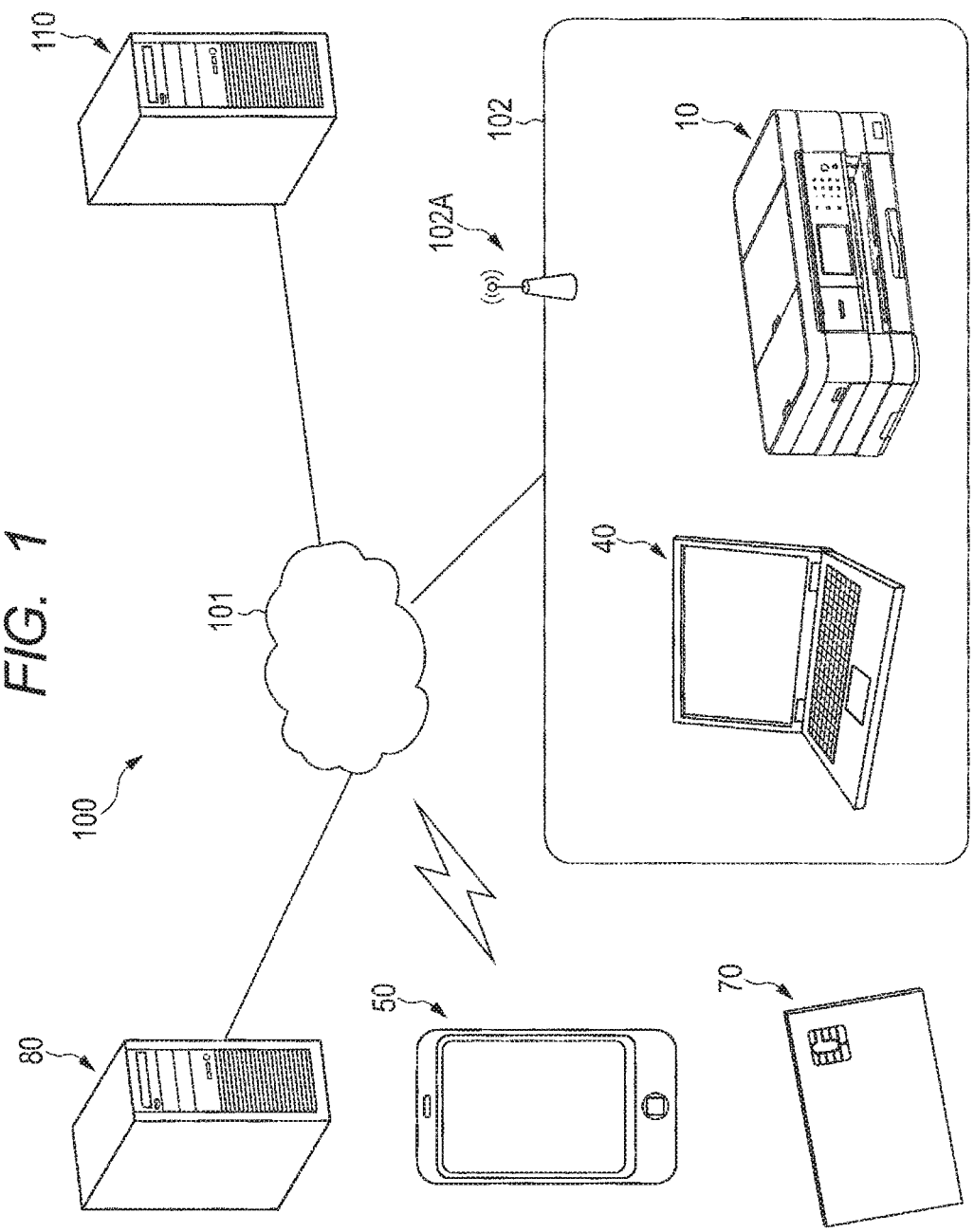

FIG. 4A

| ACCOUNT NAME | R TOKEN | SHORTCUT INFORMATION |
|---|---|---|
| ACCOUNT A | 0x51D | www.brother.jp/action3.xml?service=A |
| ACCOUNT B | 0x24A | — |

FIG. 4B

| R TOKEN | SHORTCUT INFORMATION |
|---|---|
| 0x2F6 | — |

FIG. 4C

| R TOKEN | Temp ID |
|---|---|
| 0x3DB | 1234 |
| 0xC69 | 5678 |

COMMUNICATION SYSTEM TO PERFORM DATA COMMUNICATION BETWEEN AN IMAGE FORMING APPARATUS AND A SERVICE PROVIDING APPARATUS

CROSS REFERENCE TO RELATED APPLICATIONS

This application is a continuation application of U.S. Ser. No. 15/168,329 filed on May 31, 2016, now U.S. Pat. No. 9,733,875 granted on Aug. 15, 2017 and claims priority from Japanese Patent Application No. 2015-131754 filed Jun. 30, 2015. The entire contents of each of which are incorporated herein by reference.

TECHNICAL FIELD

This disclosure relates to a communication system configured to perform data communication between an image forming apparatus and a service providing apparatus, and so on.

BACKGROUND

Conventionally, a communication system is known in which a user operates an image forming apparatus to access a service providing apparatus, and uses a service provided by the service providing apparatus through the image forming apparatus. For example, in a known system, when a user registers an image forming apparatus at a service providing apparatus through a PC, the service providing apparatus notifies the PC about authentication information. And, once the user inputs the authentication information in the image forming apparatus, the user can access the service providing apparatus by using the image forming apparatus.

SUMMARY

According to one aspect, this specification discloses a communication system including an image forming apparatus, a card, and a server on Internet. The communication system is configured to receive a service from a service providing apparatus on the Internet. The image forming apparatus includes: an image forming device configured to form an image; a first communicator configured to perform communication with an external apparatus through the Internet; a first near-field communicator configured to perform near-field wireless communication with an external apparatus by using a near-field wireless communication protocol; an operating interface; an apparatus processor; and an apparatus memory storing instructions. When executed by the apparatus processor, the instructions cause the image forming apparatus to: execute a receiving process of receiving a user operation through the operating interface; in response to receiving an instruction operation in the receiving process, execute an apparatus-side preparing process including: an issuance requesting process of transmitting issuance requesting information to the server through the first communicator, the issuance requesting information being information for requesting issuance of authentication information indicative of authority to perform data communication with the service providing apparatus, the instruction operation being a user operation of instructing execution of a preparing process for connecting the image forming apparatus to the service providing apparatus; a storage-instruction receiving process of receiving storage instructing information from the server through the first communicator, the storage instructing information being information including the authentication information issued by the service providing apparatus; and a first near-field transmitting process of, in response to approach of the card to the first near-field communicator, transmitting the authentication information included in the storage instructing information to the card through the first near-field communicator; in response to approach of a card storing the authentication information to the first near-field communicator, execute a service usage process including: a first near-field receiving process of receiving the authentication information from the card through the first near-field communicator; and a data communication process of performing data communication with the service providing apparatus through the first communicator by using the authentication information. The card includes: a second near-field communicator configured to perform near-field wireless communication with an external apparatus by using the near-field wireless communication protocol; a card processor; and a card memory storing instructions. When executed by the card processor, the instructions cause the card to: in response to approach of the image forming apparatus to the second near-field communicator, execute a card-side preparing process including: a second near-field receiving process of receiving the authentication information from the image forming apparatus through the second near-field communicator; and a first storing process of storing the received authentication information in the card memory; and in response to determining that the authentication information is stored in the card memory and to approach of the image forming apparatus to the second near-field communicator, execute a second near-field transmitting process of transmitting the authentication information stored in the card memory to the image forming apparatus through the second near-field communicator. The server includes: a second communicator configured to perform communication with an external apparatus through the Internet; a server processor; and a server memory storing instructions. When executed by the server processor, the instructions cause the server to: execute an issuance-request receiving process of receiving the issuance requesting information from the image forming apparatus through the second communicator; and in response to receiving the issuance requesting information, execute a server-side preparing process including: an authentication-information receiving process of receiving the authentication information from the service providing apparatus through the second communicator; and a storage instructing process of transmitting the storage instructing information to the image forming apparatus through the second communicator.

According to another aspect, this specification also discloses a communication system including an image forming apparatus, a card, a server on Internet, and a mobile terminal. The communication system is configured to receive a service from a service providing apparatus on the Internet. The mobile terminal includes: a mobile communicator configured to perform communication with an external apparatus through the Internet; a mobile near-field communicator configured to perform near-field wireless communication with an external apparatus by using a near-field wireless communication protocol; an operating interface; a mobile processor; and a mobile memory storing instructions. When executed by the mobile processor, the instructions cause the mobile terminal to: execute a receiving process of receiving a user operation through the operating interface; and in response to receiving an instruction operation in the receiving process, execute a mobile-side preparing process including: an issuance requesting process of transmitting issuance requesting information to the server through the mobile communicator, the issuance requesting information being information for requesting issuance of authentication information indicative of authority to perform data communication with the service providing apparatus, the instruction operation being a user operation of instructing execution of a preparing process for connecting the image forming apparatus to the service providing apparatus; a storage-instruction receiving process of receiving storage instructing information from the server through the mobile communicator, the storage instructing information being information including the authentication information issued by the service providing apparatus; and a first near-field transmitting process of, in response to approach of the card to the mobile near-field communicator, transmitting the authentication information included in the storage instructing information to the card through the mobile near-field communicator. The image forming apparatus includes: an image forming device configured to form an image; a first communicator configured to perform communication with an external apparatus through the Internet; a first near-field communicator configured to perform near-field wireless communication with an external apparatus by using a near-field wireless communication protocol; an apparatus processor; and an apparatus memory storing instructions. When executed by the apparatus processor, the instructions cause the image forming apparatus to: in response to approach of a card storing the authentication information to the first near-field communicator, execute a service usage process including: a first near-field receiving process of receiving the authentication information from the card through the first near-field communicator; and a data communication process of performing data communication with the service providing apparatus through the first communicator by using the authentication information. The card includes: a second near-field communicator configured to perform near-field wireless communication with an external apparatus by using the near-field wireless communication protocol; a card processor; and a card memory storing instructions. When executed by the card processor, the instructions cause the card to: in response to approach of the mobile terminal to the second near-field communicator, execute a card-side preparing process including: a second near-field receiving process of receiving the authentication information from the mobile terminal through the second near-field communicator; and a first storing process of storing the received authentication information in the card memory; and in response to determining that the authentication information is stored in the card memory and to approach of the image forming apparatus to the second near-field communicator, execute a second near-field transmitting process of transmitting the authentication information stored in the card memory to the image forming apparatus through the second near-field communicator. The server includes: a second communicator configured to perform communication with an external apparatus through the Internet; a server processor; and a server memory storing instructions. When executed by the server processor, the instructions cause the server to: execute an issuance-request receiving process of receiving the issuance requesting information from the mobile terminal through the second communicator; and in response to receiving the issuance requesting information, execute a server-side preparing process including: an authentication-information receiving process of receiving the authentication information from the service providing apparatus through the second communicator; and a storage instructing process of transmitting the storage instructing information to the mobile terminal through the second communicator.

According to still another aspect, this specification also discloses an image forming apparatus configured to perform communication with a card and a server on Internet. The image forming apparatus is configured to receive a service from a service providing apparatus on the Internet. The image forming apparatus includes: an image forming device configured to form an image; a first communicator configured to perform communication with an external apparatus through the Internet; a first near-field communicator configured to perform near-field wireless communication with an external apparatus by using a near-field wireless communication protocol; an operating interface; an apparatus processor; and an apparatus memory storing instructions. When executed by the apparatus processor, the instructions cause the image forming apparatus to: execute a receiving process of receiving a user operation through the operating interface; in response to receiving an instruction operation in the receiving process, execute an apparatus-side preparing process including: an issuance requesting process of transmitting issuance requesting information to the server through the first communicator, the issuance requesting information being information for requesting issuance of authentication information indicative of authority to perform data communication with the service providing apparatus, the instruction operation being a user operation of instructing execution of a preparing process for connecting the image forming apparatus to the service providing apparatus; a storage-instruction receiving process of receiving storage instructing information from the server through the first communicator, the storage instructing information being information including the authentication information issued by the service providing apparatus; and a first near-field transmitting process of, in response to approach of the card to the first near-field communicator, transmitting the authentication information included in the storage instructing information to the card through the first near-field communicator; in response to approach of a card storing the authentication information to the first near-field communicator, execute a service usage process including: a first near-field receiving process of receiving the authentication information from the card through the first near-field communicator; and a data communication process of performing data communication with the service providing apparatus through the first communicator by using the authentication information.

According to still another aspect, this specification also discloses a server configured to execute a preparing process of allowing the image forming apparatus to receive a service provided by a service providing apparatus on Internet. The server includes: a communicator configured to perform communication with an external apparatus through the Internet; a server processor; and a server memory storing instructions. When executed by the server processor, the instructions cause the server to: execute an issuance-request receiving process of receiving an issuance requesting information from the external apparatus through the communicator, the issuance requesting information being information for requesting issuance of authentication information indicative of authority to perform data communication with the service providing apparatus; and in response to receiving the issuance requesting information, execute a server-side preparing process including: an authentication-information receiving process of receiving the authentication information issued by the service providing apparatus from the service providing apparatus through the communicator; a first determining process of determining a first condition of whether the external apparatus is configured to perform near-field wireless communication compatible with a near-field wireless communication protocol and a second condition of whether the external apparatus is other than the image forming apparatus; and a storage instructing process of, in response to determining in the first determining process that both of the first condition and the second condition are positive, transmitting first storage instructing information to the image forming apparatus through the communicator, the first storage instructing information including the authentication information issued by the service providing apparatus, the first storage instructing information being storage instructing information of instructing transmitting the authentication information to a card by the near-field wireless communication for storing the authentication information in the card.

According to still another aspect, this specification also discloses a non-transitory computer-readable storage medium storing instructions readable by a mobile terminal. The mobile terminal is configured to perform communication with a card and a server on Internet and configured to allow an image forming apparatus to receive a service provided by a service providing apparatus on the Internet. The mobile terminal has a communicator configured to perform communication with an external apparatus through the Internet, a near-field communicator configured to perform near-field wireless communication with an external apparatus by using a near-field wireless communication protocol, an operating interface, and a processor. When executed by the processor, the instructions cause the mobile terminal to: execute a receiving process of receiving a user operation through the operating interface; and in response to receiving an instruction operation in the receiving process, execute a mobile-side preparing process including: an issuance requesting process of transmitting issuance requesting information to the server through the communicator, the issuance requesting information being information for requesting issuance of authentication information indicative of authority to perform data communication with the service providing apparatus, the instruction operation being a user operation of instructing execution of a preparing process for connecting the image forming apparatus to the service providing apparatus; a storage-instruction receiving process of receiving storage instructing information from the server through the communicator, the storage instructing information being information including the authentication information issued by the service providing apparatus; and a first near-field transmitting process of, in response to approach of the card to the near-field communicator, transmitting the authentication information included in the storage instructing information to the card through the near-field communicator.

BRIEF DESCRIPTION OF THE DRAWINGS

Embodiments in accordance with this disclosure will be described in detail with reference to the following figures wherein:

FIG. 1 is a schematic diagram showing a communication system 100 according to an embodiment;

FIG. 4A is an example of an account list stored in a data storage area 32B;

FIG. 4B is an example of an R token and shortcut information stored in a storage 72;

FIG. 4C is an example of a token list stored in a data storage area 92B;

FIGS. 11A and 11B are display examples of a display 23, wherein FIG. 11A shows a top screen and FIG. 11B shows a service view screen;

FIGS. 12A and 12B are display examples of the display 23, wherein

FIG. 12A shows a token selecting screen and FIG. 12B shows an ID receiving screen;

FIGS. 13A and 13B are display examples of the display 23, wherein FIG. 13A shows a storage-location selecting screen and FIG. 13B shows a near-field waiting screen; and FIGS. 14A and 14B are display examples of the display 23, wherein FIG. 14A shows an overwriting confirmation screen and FIG. 14B shows an account-name inputting screen.

DETAILED DESCRIPTION

Figure 2A:
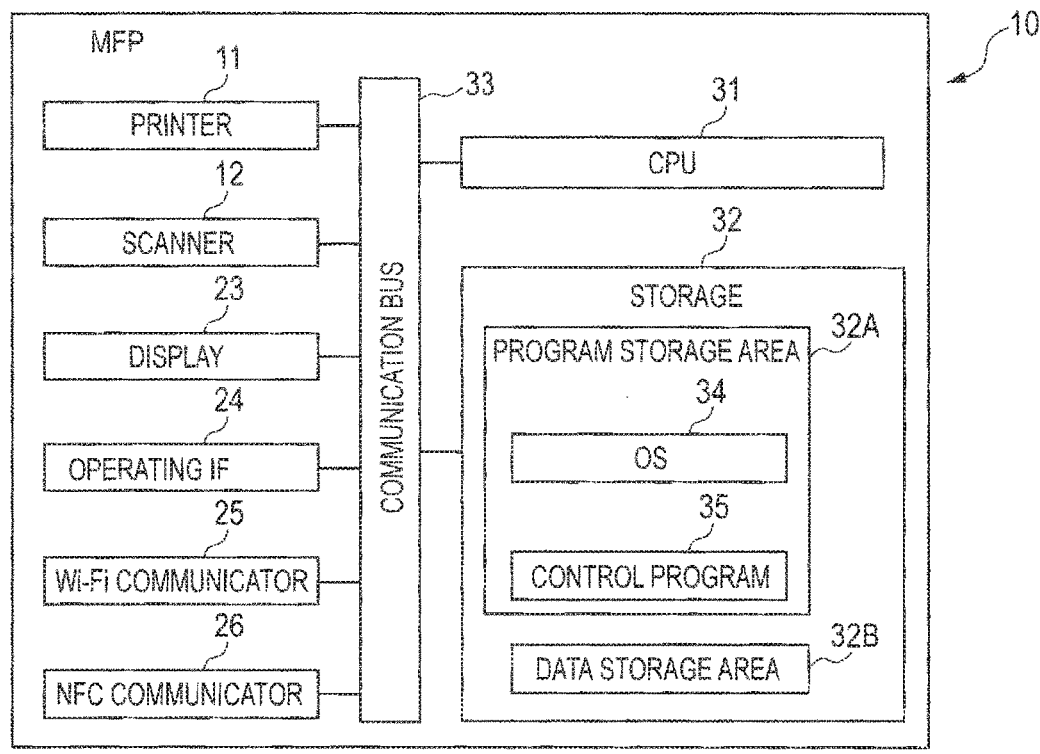
FIG. 2A is a functional block diagram of a multifunction peripheral (MFP) 10.

According to the system of the above-described configuration, however, a user is required to perform not only an operation of registering the image forming apparatus at the service providing apparatus but also an operation of inputting authentication information displayed on a PC screen to the image forming apparatus. That is, there arises a problem that a user needs to perform cumbersome operations for accessing the service providing apparatus by using the image forming apparatus.

In view of the foregoing, an example of the object of this disclosure is to provide a communication system that simplifies user operations for accessing a service providing apparatus by using an image forming apparatus.

Some aspects of this disclosure will be described while referring to the accompanying drawings.

A communication system 100 shown in FIG. 1 includes a part or all of a multifunction peripheral (MFP) 10, an information processing terminal 40, a mobile terminal 50, a card 70, and a relay apparatus 80. The communication system 100 is a system for receiving a service provided by a service providing apparatus 110. The MFP 10, the information processing terminal 40, the mobile terminal 50, the relay apparatus 80, and the service providing apparatus 110 perform communication with one another through a communication network. The communication network is not limited to a specific example, but may be Internet 101, a wired LAN (Local Area Network), a wireless LAN 102, or a combination thereof, for example.

The MFP 10 and the information processing terminal 40 belong to the wireless LAN 102. The wireless LAN 102 is connected to the Internet 101 through a router and so on (not shown). The mobile terminal 50 is connected to the Internet 101 through a base station (not shown). Further, the relay apparatus 80 and the service providing apparatus 110 are connected to the Internet 101. Here, the term "belong to the wireless LAN 102" means that settings for belonging to the wireless LAN 102 is done and that the apparatus can perform communication with another apparatus belonging to the wireless LAN 102. More specifically, the same SSID as an access point 102A of the wireless LAN 102 is set to the MFP 10 and the information processing terminal 40. The IP addresses assigned to the MFP 10 and the information processing terminal 40 include a network address portion indicative of a network address assigned to the wireless LAN 102 and a host portion unique to each of the MFP 10 and the information processing terminal 40.

The MFP 10 and the information processing terminal 40 perform communication with the relay apparatus 80 and the service providing apparatus 110 from the access point 102A and the router (not shown) through the Internet 101. The mobile terminal 50 perform wireless communication with the relay apparatus 80 and the service providing apparatus 110 from the base station (not shown) through the Internet 101. Here, the wireless communication is not limited to that wireless communication is performed in the entire communication. That is, the term "the MFP 10 performs wireless transmission or wireless reception of information or data through the access point 102A" means that wireless communication is performed at least between the MFP 10 and the access point 102A. The same goes for the information processing terminal 40 and the mobile terminal 50.

[MFP 10]

As shown in FIG. 2A, the MFP 10 mainly includes a printer 11, a scanner 12, a display 23, an operating IF (interface) 24, a Wi-Fi™ (Trademark of Wi-Fi Alliance) communicator 25, an NFC (Near Field Communication) communicator 26, a CPU 31, a storage 32, and a communication bus 33. The elements constituting the MFP 10 are connected to one another through the communication bus 33. The MFP 10 is an example of an image forming apparatus. The printer 11 and the scanner 12 are an example of an image forming device that forms an image. The Wi-Fi communicator 25 is an example of a communicator and a first communicator. The NFC communicator 26 is an example of a near-field communicator and a first near-field communicator.

[Printer 11, Scanner 12]

The printer 11 performs a recording operation of recording an image represented by image data on recording paper. The recording paper is an example of a sheet or a recording medium. As a recording method of the printer 11, a known method may be adopted such as an inkjet method or an electro-photographic method. The scanner 12 performs a scan operation of reading an image recorded on an original document and generating image data. The MFP 10 may further perform a FAX operation of performing transmission and reception of FAX, a copy operation of reading an image recorded on recording paper and recording the image on another recording paper, and so on.

[Display 23]

The display 23 includes a display screen that displays various kinds of information. As the display 23, a liquid crystal display, an organic electro-luminescence (EL) display, and so on may be adopted.

[Operating IF 24]

The operating IF 24 receives a user operation of selecting an object that is displayed on the display screen of the display 23. Specifically, the operating IF 24 has buttons, and outputs various operation signals associated with pressed buttons to the CPU 31. The operating IF 24 may further have a film-like touch sensor that is layered on the display screen of the display 23. That is, the display 23 may be a touch panel display.

Here, the term "object" denotes an image that can be selected by user's operation on the operating IF 24. As one example, objects may be character strings displayed on the display 23, and one of the objects may be highlighted by pressing a cursor key of the operating IF 24, and the highlighted object may be selected by pressing the enter button of the operating IF 24. As another example, objects in a case where the operating IF 24 is a touch panel may be icons, buttons, links, and so on, displayed on the display 23, and the object displayed at a touched position may be selected.

The operating IF 24 realized as a touch panel receives a user operation of touching the display screen of the display 23. The operating IF 24 outputs positional information indicative of the position on the display screen that is touched by the user. For example, the positional information is represented by a coordinate (x, y) on an x-y plane where the left upper end of the display screen is the origin, the rightward direction is the positive direction of the x-axis, and the downward direction is the positive direction of the y-axis. As a touch sensor, a known type such as a capacitance type and a resistive type may be adopted.

The term "touch" in this specification includes all operations that an input medium touches the display screen. That is, the examples of touch operations include a tap operation of separating a touched input medium from the display screen in a particular period, a long touch operation of making the touched input medium still on the display screen, a slide operation of sliding the touched input medium on the display screen, a flick operation of sliding the touched input medium on the display screen at acceleration higher than or equal to a threshold, a pinch-in operation of sliding two input mediums touching at different positions on the display screen in directions approaching each other, a pinch-out operation of sliding two input mediums touching at different positions on the display screen in directions separating from each other, and so on.

The above-mentioned "touch" may also include that an input medium is moved to a position that is very close to the display screen although the input medium is not touching the display screen. Further, the input medium may be a finger of a user, or may be a touch pen, or the like. Hereinafter, descriptions will be provided by taking a tap on the position of an icon displayed on the display 23 as an example of the user operation of selecting the icon.

[Wi-Fi Communicator 25]

The Wi-Fi communicator 25 is an interface for performing wireless communication with an external apparatus. Specifically, the Wi-Fi communicator 25 performs communication with the information processing terminal 40, the mobile terminal 50, the relay apparatus 80, and the service providing apparatus 110. The Wi-Fi communicator 25 performs communication in a procedure compatible with the IEEE802.11 standard, for example.

[NFC Communicator 26]

The NFC communicator 26 is an interface for performing wireless communication with a near-field wireless method compatible with the NFC standard. The wireless communication with the external apparatus through the NFC communicator 26 is an example of near-field wireless communication. An IC chip is mounted on the NFC communicator 26, the IC chip having a memory storing information transmitted to or received from the external apparatus. The NFC standard is an example of a near-field wireless communication protocol. As another example of the near-field communication protocol, TransferJet™ (Trademark of TransferJet) and so on may be adopted.

In this specification, a device that performs communication in a procedure compatible with the NFC standard is referred to as "NFC device", and communication performed in the procedure compatible with the NFC standard is referred to as "NFC communication". That is, the MFP 10, the mobile terminal 50, and the card 70 are examples of the NFC device. The MFP 10 and the mobile terminal 50 operate in one of a P2P (Peer to Peer) mode, a Reader mode, a Writer mode, and a CE (Card Emulation) mode. In this specification, the Reader mode and the Writer mode may be collectively referred to as "R/W mode".

The P2P mode is a mode for performing bidirectional communication between a pair of NFC devices. A TypeA NFC device defined by ISO/IEC 1443 established by the NFC forum and a TypeF NFC device defined by ISO/IEC 18092 operate in the P2P mode. On the other hand, a TypeB NFC device defined by ISO/IEC 1443 cannot operate in the P2P mode.

The R/W mode and the CE mode are modes for performing unidirectional communication between a pair of NFC devices. The CE mode is a mode for the NFC device to operate by pretending to be "card" that is a format set by the NFC forum. The card 70 operates as a card compatible with the NFC standard. In this specification, for simplicity, both cases that the NFC device operates in the CE mode and that the NFC device operates as a card compatible with the NFC standard are sometimes expressed that the NFC device operates in the CE mode. The TypeA, TypeF, and TypeB NFC devices can operate in the CE mode. The Reader mode is a mode for reading out information and so on from an NFC device operating in the CE mode. The Writer mode is a mode for writing various kinds of information in an NFC device operating in the CE mode.

In the present embodiment, descriptions will be provided by taking an example that the MFP 10 operates in the R/W mode and the card 70 operates in the CE mode. That is, the MFP 10 operating in the R/W mode reads out information and so on from the card 70 operating in the CE mode and writes information and so on in the card 70. However, this disclosure is not limited to this. For example, the MFP 10 may operate in the CE mode, and the card 70 may operate in the R/W mode. Or, both of the MFP 10 and the card 70 may operate in the P2P mode. The same goes for the case where the mobile terminal 50 and the card 70 perform the NFC communication.

The NFC communicator 26 of the MFP 10 in the present embodiment performs a poll operation. The poll operation is an operation of repeatedly outputting a polling signal at a particular time interval and of monitoring a response signal that is a response to the polling signal. On the other hand, the NFC communicator 73 of the card 70 in the present embodiment performs a listen operation. The listen operation is an operation of monitoring a polling signal and of outputting a response signal on condition that the polling signal has been received.

When the card 70 approaches the MFP 10, the NFC communicator 73 of the card 70 receives a polling signal outputted by the NFC communicator 26 of the MFP 10, and the NFC communicator 26 of the MFP 10 receives a response signal outputted by the NFC communicator 73 of the card 70. Then, a NFC-method communication link (hereinafter referred to as "NFC link") is established between the MFP 10 and the card 70 by a particular procedure in accordance with the NFC standard. After that, the MFP 10 and the card 70 transmit and receive information and so on through the NFC link.

However, the relationship between the MFP 10 and the card 70 is not limited to the above-described example. For example, the NFC communicator 26 of the MFP 10 may perform the listen operation, and the NFC communicator 73 of the card 70 may perform the poll operation. In this case, when the card 70 approaches the MFP 10, the NFC communicator 26 of the MFP 10 receives a polling signal outputted by the NFC communicator 73 of the card 70, and the NFC communicator 73 of the card 70 receives a response signal outputted by the NFC communicator 26 of the MFP 10. Then, the NFC link is established between the MFP 10 and the card 70.

[CPU 31]

The CPU (Central Processing Unit) 31 controls the entire operation of the MFP 10. The CPU 31 acquires and executes various programs described later from the storage 32, based on various information outputted from the operating IF 24 and on various information and so on acquired from an external apparatus through the Wi-Fi communicator 25 and the NFC communicator 26. That is, the CPU 31 and the storage 32 constitute an example of an apparatus processor.

[Storage 32]

The storage 32 has a program storage area 32A and a data storage area 32B. The program storage area 32A stores an OS (Operating System) 34 and a control program 35. The OS 34 and the control program 35 are programs built in a binary format. The control program 35 may be a single program, or may be a combination of a plurality of programs. The data storage area 32B stores data or information needed for executing the control program 35. The storage 32 is an example of an apparatus memory.

Here, both of "data" and "information" in this specification are a bit or a bit array that can be handled by a computer. The "data" is one that can be handled by a computer without considering the meaning of each bit. In contrast, the "information" is one that the operation of the computer branches depending on the meaning of each bit. Further, "instruction" is a control signal for prompting a transmission-destination apparatus to perform the next operation. The "instruction" sometimes includes information, and the "instruction" itself sometimes has a property of information.

Even if the format (for example, text format, binary format, flag format, and so on) is changed depending on each computer, "data" and "information" are treated as the same data and information as long as it has the same meaning. For example, information indicative of "two" may be kept as text format information "0x32" in ASCII code in a certain computer, and may be kept as binary format information "10" in another computer.

However, the above-described definitions of the "data" and "information" are not strict one, and there are also exceptions. For example, data may be temporarily treated as information, and information may be temporarily treated as data. Further, one treated as data in a certain apparatus may be treated as information in another apparatus. Further, information may be taken out of data, and data may be taken out of information.

The storage 32 includes, for example, a RAM (Random Access Memory), a ROM (Read Only Memory), an EEPROM (Electrically Erasable Programmable Read-Only Memory), a HDD (Hard Disk Drive), a buffer provided in the CPU 31, and so on, or a combination thereof.

The storage 32 may be a computer-readable storage medium. The computer-readable storage medium is a non-transitory medium. The non-transitory medium also includes recording mediums such as a CD-ROM and a DVD-ROM, in addition to the above-described examples. The non-transitory medium is a tangible medium. On the other hand, an electric signal conveying a program downloaded from a server or the like on the Internet is a computer-readable signal medium that is a kind of a computer-readable medium, but is not included in the non-transitory computer-readable storage medium.

The CPU 31 executes programs stored in the program storage area 32A. In this specification, however, operations of each program are sometimes described while omitting the CPU 31. That is, in the following description, a sentence "a program A executes a process A" may mean that "the CPU 31 executes the process A described in the program A".

The program stored in the program storage area 32A determines an event and operates depending on the determination result. In this specification, however, operations of each program are sometimes described while omitting such determination. That is, in the following description, a sentence "a control program executes a process A depending on a condition A" may mean that "The control program determines whether a condition A is satisfied. The control program executes the process A in response to a positive determination".

The program stored in the program storage area 32A identifies, extracts, or selects data and so on. The phrase "program identifies data and so on" indicates, for example, a process of identifying data matching a condition from among a plurality of data and so on and of storing, in a predetermined storage area, the data and so on itself or information identifying the data and so on. The information identifying data and so on includes, for example, identification information identifying the data and so on, an index of an array in which the data and so on are stored, a pointer of a storage area in which the data and so on are stored, and so on. The same goes for a process that a program extracts or selects data and so on.

The program stored in the program storage area 32A acquires data and so on. The phrase "program acquires data and so on" may indicate, for example, a process of reading out data from a storage area in which the data is stored. The phrase "program acquires data and so on" may indicate, for example, a process of receiving data transmitted from an external apparatus. The phrase "program acquires data and so on" may indicate, for example, a process of requesting an external apparatus to return data and of receiving the data returned from the external apparatus. The phrase "program acquires data and so on" may indicate, for example, a process of receiving data outputted from another program such as the OS. The phrase "program acquires data and so on" may indicate, for example, a process of requesting another program to output data and of receiving the data outputted from the other program.

The OS 34 is a basic program that provides API (Application Programming Interface) for controlling the printer 11, the scanner 12, the display 23, the operating IF 24, the Wi-Fi communicator 25, the NFC communicator 26, and so on, that are hardware elements constituting the MFP 10. That is, the above-described each program controls each hardware element by calling the API provided by the OS 34. In this specification, however, the operations of each program may be described while omitting the OS 34. That is, in the following description, the phrase "program B controls hardware C" may mean that "program B controls hardware C through the API of the OS 34".

As shown in FIG. 4A, for example, the data storage area 32B is configured to store account names, refresh tokens (hereinafter referred to as "R token"), and shortcut information. Hereinafter, information shown in FIG. 4A is sometimes collectively referred to as "account list", and each record shown in FIG. 4A is sometimes referred to as "account record". That is, the account list may include a plurality of account records.

The account name is a name for identifying the corresponding R token, and is arbitrarily set by a user of the MFP 10. The R token is an example of authentication information indicative of having authority to perform data communication with the service providing apparatus 110. The R token is binary data, for example. The R tokens are shown by three-digit numbers in FIG. 4A for simplicity, but may be data shown by numbers over three digits. For example, the R tokens are shown by numbers of approximately 20 digits or approximately 200 digits. The shortcut information includes a next operation URL (Uniform Resource Locator) and service usage information. Note that the shortcut information need not necessarily be included in the account list, and may be omitted.

The next operation URL is information that identifies the request destination of instruction information indicative of the next operation to be performed by the MFP 10 in a linkage operation described later. The details of the instruction information will be described later. The service usage information is information that identifies the contents of data communication with the service providing apparatus 110. In the shortcut information shown in FIG. 4A, the next operation URL is "www.brother.jp/action3.xml", and the service usage information is "service=A".

[Mobile Terminal 50]

Figure 2B:
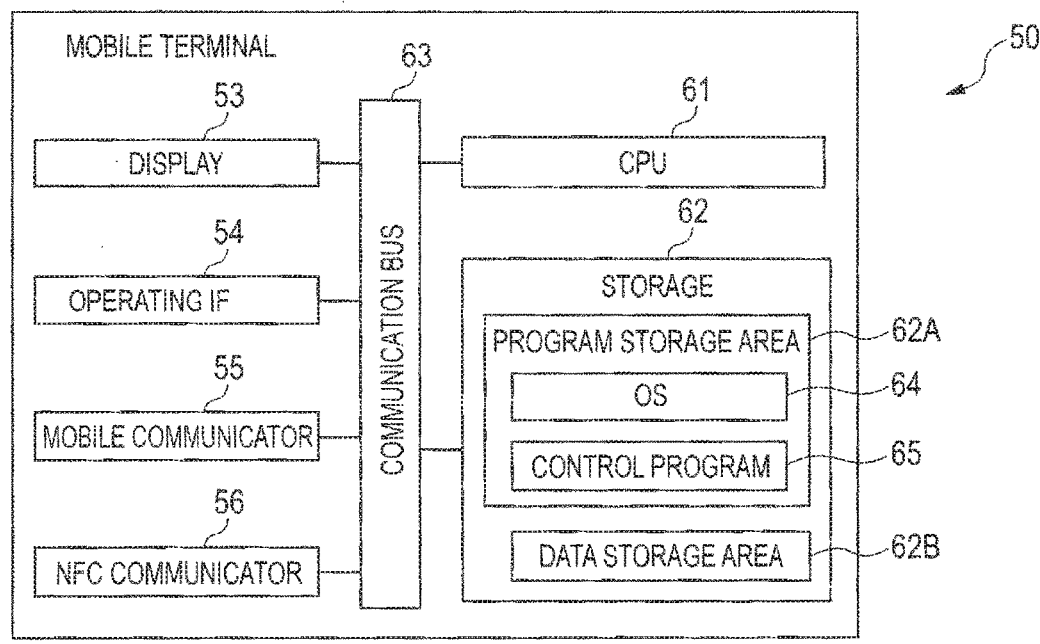
FIG. 2B is a functional block diagram of a mobile terminal 50.

As shown in FIG. 2B, the mobile terminal 50 mainly includes a display 53, an operating IF (interface) 54, a mobile communicator 55, an NFC communicator 56, a CPU 61, a storage 62, and a communication bus 63. The mobile communicator 55 is an example of a communicator and a third communicator (mobile communicator). The NFC communicator 56 is an example of a near-field communicator and a third near-field communicator (mobile near-field communicator). The CPU 61 and the storage 62 constitute an example of a mobile processor. The display 53, the operating IF 54, the NFC communicator 56, the CPU 61, the storage 62, and the communication bus 63 included in the mobile terminal 50 are basically the same as the display 23, the operating IF 24, the NFC communicator 26, the CPU 31, the storage 32, and the communication bus 33 included in the MFP 10, and hence descriptions for these elements are not repeated. The storage 62 has a program storage area 62A and a data storage area 62B. The program storage area 62A stores an OS 64 and a control program 65.

The mobile communicator 55 is an interface for connecting to a mobile communication network (not shown) provided by a telecommunication carrier. The mobile communication network (not shown) is connected to the Internet 101. For example, the mobile communicator 55 performs wireless communication in accordance with a communication standard such as W-CDMA (Wideband Code Division Multiple Access), CDMA2000, or LTE (Long Term Evolution). The mobile terminal 50 may have a Wi-Fi communicator in addition to the mobile communicator 55 or instead of the mobile communicator 55. The functions of the Wi-Fi communicator of the mobile terminal 50 are the same as the functions of the Wi-Fi communicator 25 of the MFP 10.

[Information Processing Terminal 40]

Although a functional block diagram is omitted, the information processing terminal 40 is the same as the mobile terminal 50, except that the information processing terminal 40 has the Wi-Fi communicator instead of the mobile communicator 55 and does not have the NFC communicator 56. The information processing terminal 40 is not limited to a specific example, but may be a PC (Personal Computer) and so on, for example.

[Card 70]

Figure 3A:
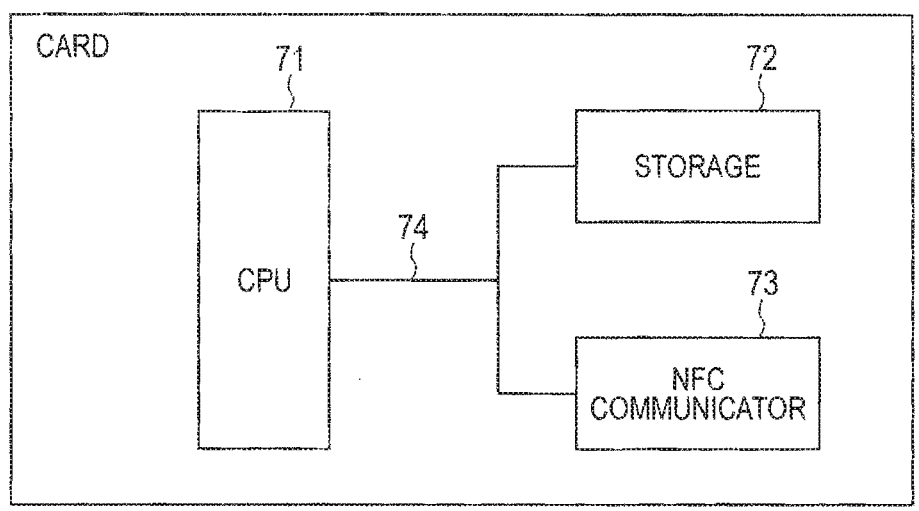
FIG. 3A is a functional block diagram of a card 70.

As shown in FIG. 3A, the card 70 mainly includes a CPU 71, a storage 72, an NFC communicator 73, and a communication bus 74. The CPU 71 and the storage 72 constitute an example of a card processor. The storage 72 is an example of a card memory. The NFC communicator 73 is an example of a second near-field communicator. The CPU 71, the storage 72, and the NFC communicator 73 included in the card 70 are basically the same as the CPU 31, the storage 32, and the NFC communicator 26 included in the MFP 10, and hence descriptions for these elements are not repeated. The CPU 71 reads out and executes programs (not shown) stored in the storage 72, thereby executing processes described later. The CPU 71, the storage 72, and the NFC communicator 73 are mounted on an integrated circuit, for example.

As shown in FIG. 4B, for example, the storage 72 is configured to store an R token and shortcut information associated with the R token. However, the shortcut information may be omitted. The number of R tokens that can be stored in the storage 72 may be one or a plural number. The R token and the shortcut information are not stored in the storage 72 of the card 70 at the time of shipment, and are stored in the storage 72 by a process described later.

Although omitted in the drawings, the storage 72 stores card information including type information and storage-number information. The type information is information indicative of whether the card 70 is configured to store an R token. The type information may be any format as long as the information can be differentiated from a card used for another purpose (for example, a train/bus card, an employee card, and so on) and the information can be used by the communication system 100 of the present embodiment. The storage-number information is information indicative of the number of R tokens stored in the storage 72.

[Relay Apparatus 80]

Figure 3B:
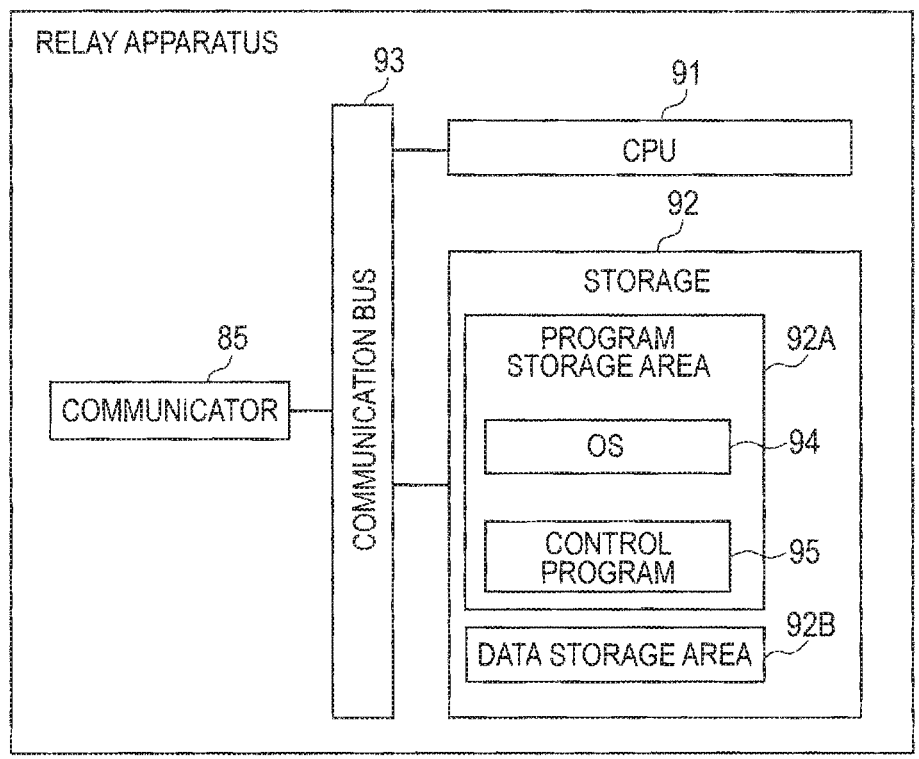
FIG. 3B is a functional block diagram of a relay apparatus 80.

As shown in FIG. 3B, the relay apparatus 80 mainly includes a communicator 85, a CPU 91, a storage 92, and a communication bus 93. The CPU 91 and the storage 92 constitute an example of a server processor. The storage 92 is an example of a server memory. The communicator 85 is an example of a second communicator. The communicator 85, the CPU 91, the storage 92, and the communication bus 93 included in the relay apparatus 80 are basically the same as the Wi-Fi communicator 25, the CPU 31, the storage 32, and the communication bus 33 included in the MFP 10, and hence descriptions for these elements are not repeated. The relay apparatus 80 is an example of a server. The storage 92 has a program storage area 92A and a data storage area 92B. The program storage area 92A stores an OS 94 and a control program 95.

As shown in FIG. 4C, for example, a data storage area 92B is configured to store R tokens and TempIDs associated with the R tokens. Hereinafter, information shown in FIG. 4C is sometimes collectively referred to as "token list", and each record shown in FIG. 4C is sometimes referred to as "token record". That is, the token list may include a plurality of token records. The TempID is an example of identification information that is issued by the relay apparatus 80 in association with the R token. The TempID is an array of numbers, for example.

[Linkage Operation of MFP 10 and Relay Apparatus 80]

The MFP 10 and the relay apparatus 80 perform a linkage operation. The linkage operation is started when a user inputs a start instruction of the linkage operation in the MFP 10. The linkage operation is an operation that the MFP 10 requests the relay apparatus 80 to transmit instruction information indicative of an operation of the MFP 10, the relay apparatus 80 returns instruction information to the MFP 10, the MFP 10 performs the operation indicated by the instruction information, the MFP 10 reports the result of this operation to the relay apparatus 80, and the relay apparatus 80 transmits instruction information indicative of the next operation to the MFP 10 based on this report. In the linkage operation, information from the MFP 10 to the relay apparatus 80 is transmitted as a HTTP (HyperText Transfer Protocol) request, and information from the relay apparatus 80 to the MFP 10 is transmitted as a HTTP response. The details of the linkage operation will be described while referring to the flowcharts in FIGS. 6 to 10.

The instruction information transmitted from the relay apparatus 80 to the MFP 10 is described in an XML (eXtensible Markup Language), for example. This instruction information includes, for example, screen definition information for defining a screen displayed on the display 23, interface information for identifying an interface to acquire information (for example, the operating IF 24, the Wi-Fi communicator 25, the NFC communicator 26, and so on), and a next operation URL for identifying the request destination of the next instruction information. The instruction information may further include service usage information added to the HTTP request that requests this instruction information.

The MFP 10 having received this instruction information displays a screen defined by the screen definition information on the display 23, acquires information through the interface identified by the interface information, and transmits a HTTP request for requesting transmission of the next instruction information indicated by the next operation URL. When transmitting this HTTP request, the MFP 10 transmits, to the relay apparatus 80, the service usage information acquired in a series of linkage operations by a GET method. That is, the URL analyzed by the MFP 10 is such that service usage information is added to the end of the next operation URL, as shown by the shortcut information in FIG. 4A.

[Service Providing Apparatus 110]

The service providing apparatus 110 is an apparatus that provides the MFP 10 with a service. For example, the service providing apparatus 110 of the present embodiment may provide a service of managing a state of the MFP 10, a service of storing uploaded data, a service of returning stored data in response to a download request, a service of converting the format of data, and so on. Although in FIG. 1 only one service providing apparatus 110 is shown, a plurality of service providing apparatuses 110 may be provided.

[Operation of Communication System 100]

The operations of the communication system 100 according to the present embodiment will be described while referring to FIGS. 5 to 14B. The communication system 100 of the present embodiment performs a process of storing an R token issued by the service providing apparatus 110 in the MFP 10 or the card 70, and of allowing the MFP 10 to receive a service provided by the service providing apparatus 110 by using this R token.

Figure 5:
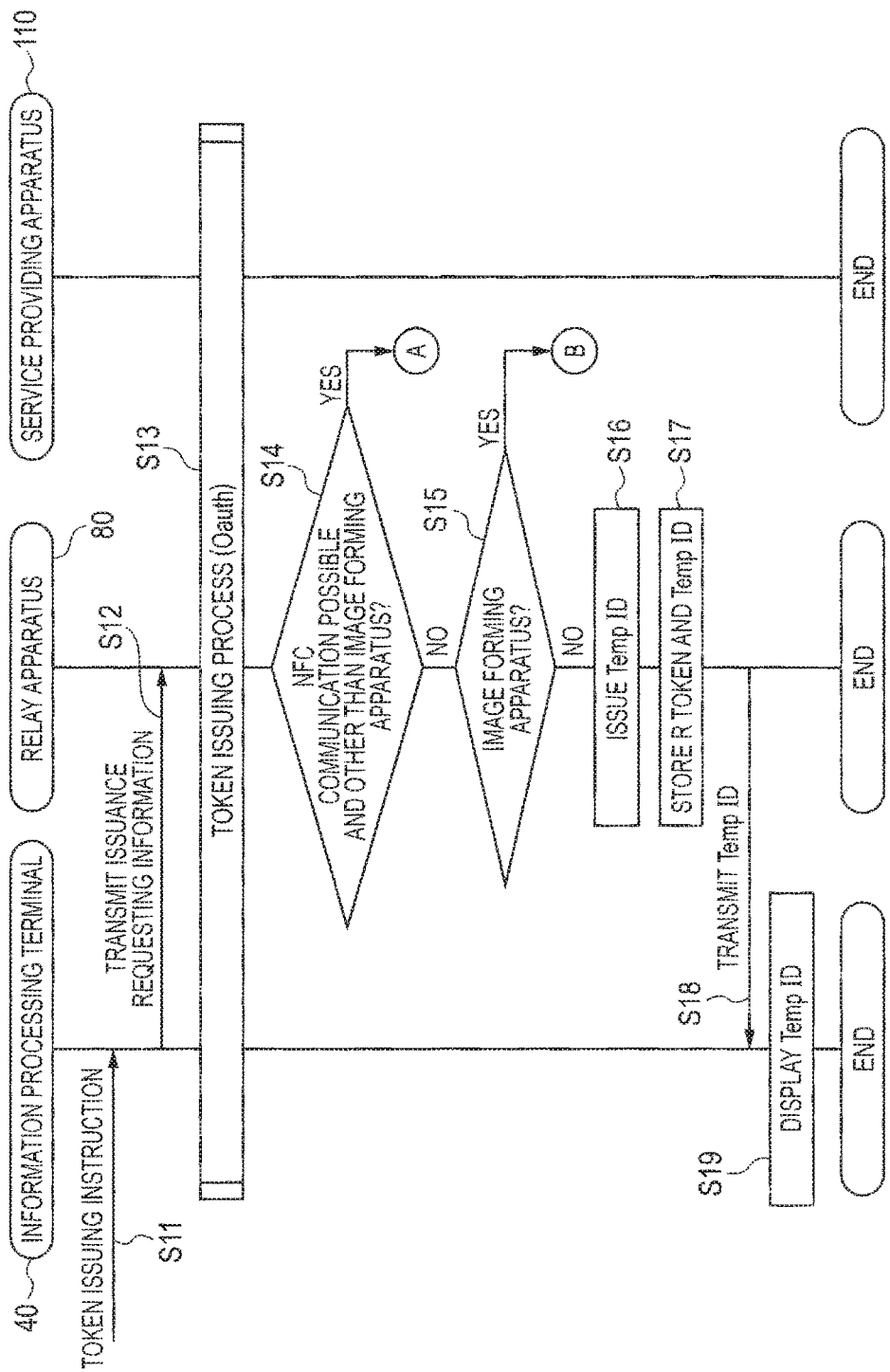
FIG. 5 is a flowchart showing the process of causing a service providing apparatus 110 to issue an R token though an information processing terminal 40.
Figure 6:
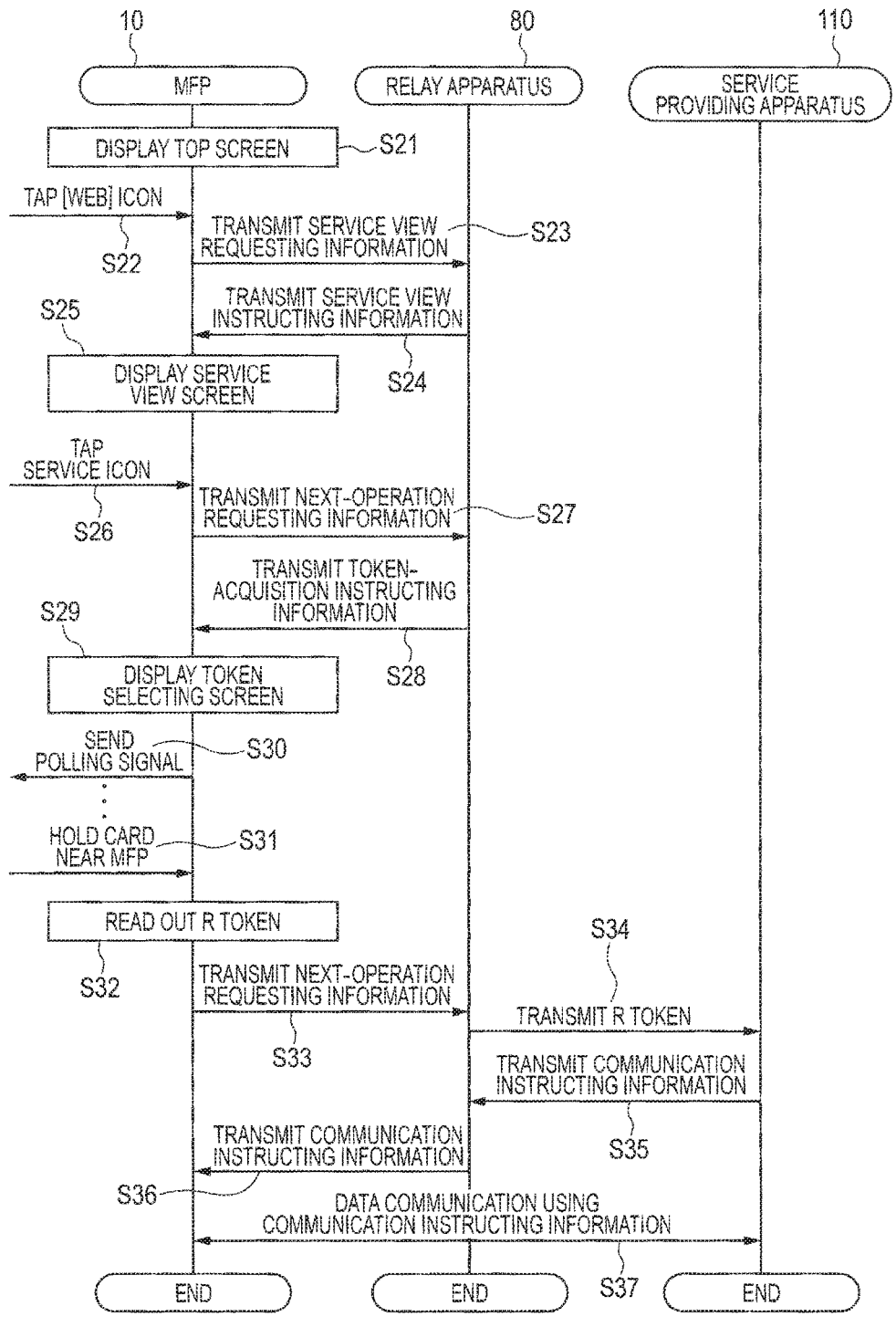
FIG. 6 is a flowchart showing the process of allowing the MFP 10 to have a service provided by the service providing apparatus 110.

The process of the MFP 10 shown in FIG. 6 is an example of a service usage process. Of the processes shown in FIGS. 7 to 10, the process of the MFP 10 is an example of an apparatus-side preparing process, the process of the card 70 is an example of a card-side preparing process, and the process of the relay apparatus 80 is an example of a server-side preparing process. Note that it is not necessary to execute all the processes shown in FIGS. 5, 7, and 8, but only a part of the processes may be executed.

FIG. 5 is a process of causing the service providing apparatus 110 to issue an R token and of acquiring the TempID corresponding to this R token from the relay apparatus 80. First, the information processing terminal 40 receives a token issuing instruction from a user through the operating IF (S11) ("Step" is abbreviated as "S"). Next, the information processing terminal 40 transmits issuance requesting information to the relay apparatus 80 through the communicator (S12). The token issuing instruction is an example of an instruction operation of instructing execution of a preparing process for connecting the MFP 10 to the service providing apparatus 110. The token issuing process is an example of the preparing process.

The issuance requesting information is information for requesting issuance of an R token by the token issuing process. The issuance requesting information may include NFC compatibility information and apparatus information. The NFC compatibility information is information indicative of whether the apparatus of transmission source of the issuance requesting information is configured to perform NFC communication. The apparatus information is information indicative of whether the apparatus of the transmission source of the issuance requesting information is an image forming apparatus. In other words, the apparatus information is information indicative of whether the apparatus has the printer 11 and the scanner 12, or whether the apparatus is configured to receive a service provided by the service providing apparatus 110. That is, the issuance requesting information transmitted by the information processing terminal 40 includes the NFC compatibility information indicating that the apparatus is not configured to perform NFC communication and the apparatus information indicating that the apparatus is not an image forming apparatus.

Next, the control program 95 of the relay apparatus 80 receives the issuance requesting information from the information processing terminal 40 through the communicator 85 (S12). The process of S12 is an example of an issuance-request receiving process. The control program 95 then executes a token issuing process (S13). The token issuing process is a process of causing the information processing terminal 40 to acquire the R token issued by the service providing apparatus 110, due to linkage operations of the information processing terminal 40, the relay apparatus 80, and the service providing apparatus 110. The token issuing process is executed in accordance with a known procedure compatible with an Oauth protocol, for example.

Because the token issuing process is known, the details are omitted in the drawings. For example, the control program 95 of the relay apparatus 80 transmits request-token issuance requesting information to the service providing apparatus 110 through the communicator 85, receives a request token from the service providing apparatus 110 through the communicator 85, and transmits an access page URL, a relay apparatus URL, and the request token to the information processing terminal 40 through the communicator 85. The access page URL is a URL indicative of a location of an access page for inputting an account ID and a password. The access page of the present embodiment is provided by the service providing apparatus 110. The relay apparatus URL is a URL indicative of the transmission destination of the R token received from the service providing apparatus 110. The transmission destination of the R token in the present embodiment is the relay apparatus 80.

Next, the information processing terminal 40 receives the access page URL, the relay apparatus URL, and the request token from the relay apparatus 80, and requests the service providing apparatus 110 to transmit page data of the access page indicated by the access page URL. At this time, the information processing terminal 40 is authorized by the service providing apparatus 110 by the request token. Further, the information processing terminal 40 transmits the relay apparatus URL together with a page data request to the service providing apparatus 110. Next, the information processing terminal 40 receives the page data, displays the access page, receives a user operation for inputting an account ID and a password, and transmits the account ID and the password to the service providing apparatus 110 by using the request token. Note that "token" may be key information for encrypting information, for example. In this case, the phrase "perform communication by using a token" may mean sending information encrypted by the token to a communication network. However, the method of using the token is not limited to this, and the token may be used in another known method.

Next, the service providing apparatus 110 receives the account ID and the password from the information processing terminal 40, and transmits, to the information processing terminal 40, the R token corresponding to the account ID and the password and the relay apparatus URL received from the information processing terminal 40. The information processing terminal 40 receives the R token and the relay apparatus URL from the service providing apparatus 110, and transmits the R token to the relay apparatus 80 by using this relay apparatus URL. The control program 95 of the relay apparatus 80 receives the R token from the information processing terminal 40 through the communicator 85.

Next, based on NFC compatibility information included in the issuance requesting information, the control program 95 determines whether the apparatus of the transmission source of this issuance requesting information is configured to perform NFC communication and the apparatus is other than an image forming apparatus (S14). In response to determination that NFC communication cannot be performed or that the apparatus is an image forming apparatus (S14: No), based on the apparatus information included in the issuance requesting information, the control program 95 determines whether the apparatus of the transmission source of this issuance requesting information is an image forming apparatus (S15). The process of S14 is an example of a first determining process, and the process of S15 is an example of a second determining process.

The control program 95 issues a TempID in response to determination that NFC communication cannot be performed and the apparatus is not an image forming apparatus (S14: No & S15: No) (S16). That is, when the information processing terminal 40 is the transmission source of the issuance requesting information, S16 is executed. The control program 95 adds, to the token list shown in FIG. 4C, a token record including the R token received in S13 and the TempID issued in S16 (S17). Further, the control program 95 transmits the TempID issued in S16 to the apparatus of the transmission source of the issuance requesting information through the communicator 85 (S18). When the information processing terminal 40 is the transmission source of the issuance requesting information, the information processing terminal 40 receives the TempID from the relay apparatus 80 (S18). The information processing terminal 40 displays the received TempID on the display (S19).

The TempID is an example of identification information for identifying the R token received from the service providing apparatus 110 in the token issuing process (S13). The process of S16 is an example of a generating process, the process of S17 is an example of a storing process and a third storing process, and the process of S18 is an example of an identification-information transmitting process. On the other hand, in response to determination that NFC communication can be performed and the apparatus is other than an image forming apparatus (S14: Yes), the control program 95 of the relay apparatus 80 executes the process of S80 shown in FIG. 10. That is, when the mobile terminal 50 is the transmission source of the issuance requesting information, S80 is executed. In response to determination that the apparatus is an image forming apparatus (S15: Yes), the control program 95 executes the process of S85 shown in FIG. 10. That is, when the MFP 10 is the transmission source of the issuance requesting information, S85 is executed. The details of these processes will be described later.

Figure 11A:
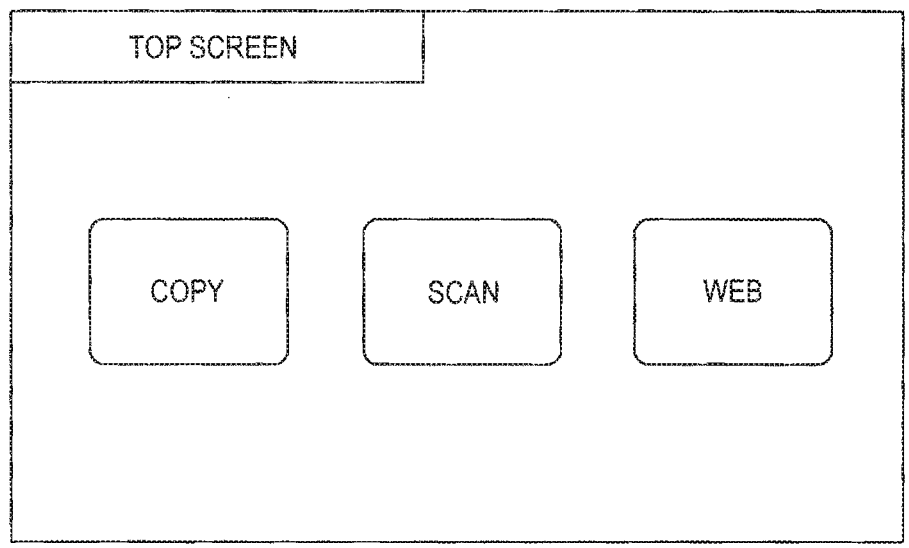

FIG. 6 shows a process that the MFP 10 uses a service provided by the service providing apparatus 110. When the power of the MFP 10 is turned on, the control program 35 of the MFP 10 displays a top screen on the display 23 (S21). FIG. 11A is an example of the top screen. The top screen shown in FIG. 11A includes a [Copy] icon, a [Scan] icon, and a [Web] icon. The [Copy] icon corresponds to an instruction of causing the MFP 10 to perform a copy operation. The [Scan] icon corresponds to an instruction of causing the MFP 10 to perform a scan operation. The [Web] icon corresponds to an instruction of causing the MFP 10 to receive a service provided by the service providing apparatus 110. When the MFP 10 is in a standby state, too, the top screen is displayed.

The control program 35 receives selection of an icon in the top screen through the operating IF 24. This process is an example of a receiving process. In response to receiving selection of the [Copy] icon through the operating IF 24, the control program 35 controls the printer 11 and the scanner 12 to perform the copy operation. In response to receiving selection of the [Scan] icon through the operating IF 24, the control program 35 controls the scanner 12 to perform the scan operation. Further, in response to receiving selection of the [Web] icon through the operating IF 24 (S22), the control program 35 transmits service view requesting information to the relay apparatus 80 through the Wi-Fi communicator 25 (S23). The service view requesting information is information for requesting a view of services available to the MFP 10.

Next, the control program 95 of the relay apparatus 80 receives the service view requesting information from the MFP 10 through the communicator 85 (S23). The control program 95 then transmits the service view instruction information to the MFP 10 through the communicator 85 (S24). The service view instruction information includes screen definition information defining a service view screen, interface information indicative of receiving selection of an icon in the service view screen through the operating IF 24, a next operation URL corresponding to each icon, and service usage information corresponding to each icon. The service usage information corresponding to an icon is the service usage information to be transmitted to the relay apparatus 80 when the corresponding icon is selected.

Figure 11B:
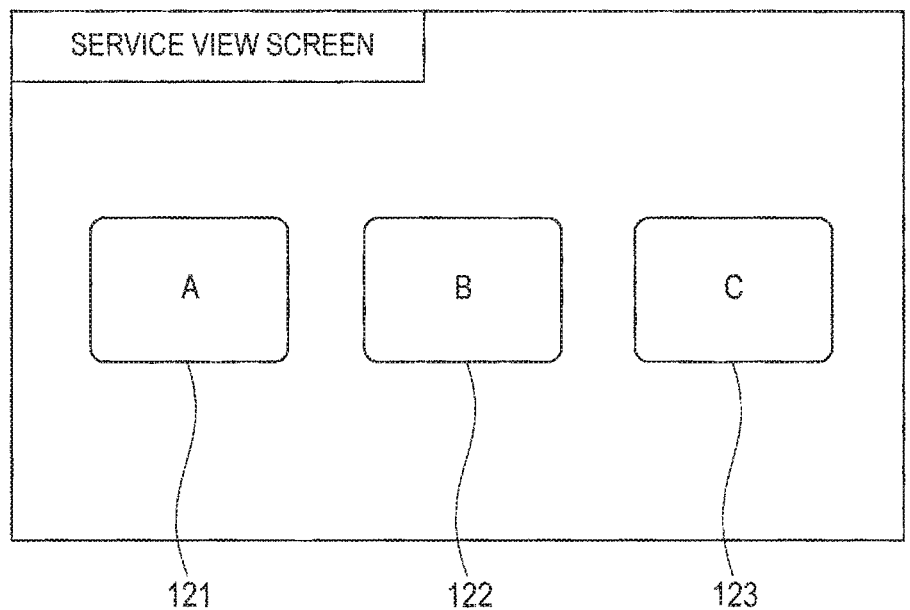

Next, the control program 35 of the MFP 10 receives the service view instruction information from the relay apparatus 80 through the Wi-Fi communicator 25 (S24). The control program 35 then displays, on the display 23, the service view screen in accordance with the screen definition information and the interface information (S25). The screen definition information indicates displaying a screen title "service view screen", displaying options in a list, and texts "A", "B", and "C" indicative of each option. The interface information indicates receiving selection of an option through the operating IF 24. FIG. 11B is an example of the service view screen. The service view screen shown in FIG. 11B includes a plurality of service icons 121, 122, and 123. Each of the service icons 121 to 123 corresponds to a service provided by the service providing apparatus 110.

Next, the control program 35 receives selection of one of the service icons 121 to 123 through the operating IF 24 (S26). The process of S26 is an example of a receiving process. The selection of the service icons 121 to 123 is an example of a service using operation. Next, in response to receiving selection of one of the service icons 121 to 123 through the operating IF 24 (S26), the control program 35 acquires service usage information corresponding to this service icon from the service view instruction information. The control program 35 then temporarily stores the acquired service usage information in the data storage area 32B. In the present embodiment, the following descriptions are continued assuming that the service icon 121 is selected.

Next, the control program 35 transmits next-operation requesting information to the relay apparatus 80 through the Wi-Fi communicator 25 (S27). The next-operation requesting information is information for requesting instruction information indicative of an operation that the MFP 10 should perform next. More specifically, the next-operation requesting information of S27 is an HTTP request directed to the next operation URL corresponding to the service icon 121. Here, the next operation URL is a URL indicative of instruction information indicative of an operation that the MFP 10 should perform next when the service icon 121 is selected. The next-operation requesting information includes the service usage information that is temporarily stored in the data storage area 32B in S26. That is, the service usage information in a case where the service icon 121 is selected includes "service=A". The process of S27 executed by the MFP 10 is an example of a usage-information transmitting process.

Next, the control program 95 of the relay apparatus 80 receives the next-operation requesting information from the MFP 10 through the communicator 85 (S27). Next, the control program 95 determines whether the next-operation requesting information includes all information needed for generating communication instruction information described later. Here, when the next-operation requesting information includes all service usage information but does not include an R token out of all the information needed for generating the communication instruction information, the control program 95 transmits token-acquisition instruction information to the MFP 10 through the communicator 85

(S28). The token-acquisition instruction information includes screen definition information defining a token selecting screen, interface information indicative of receiving selection of an icon in the token selecting screen through the operating IF 24 and indicative of receiving an R token through the NFC communicator 26, a next operation URL corresponding to each operation, and service usage information "service=A". Although the details will be described later, the R token is stored in the MFP 10 or in the card 70 by the process shown in FIGS. 9 and 10. The process will be described later for a case where the next-operation requesting information only includes a part of the service usage information out of all the information needed for generating the communication instruction information.

Next, the control program 35 of the MFP 10 receives token-acquisition instruction information from the relay apparatus 80 through the Wi-Fi communicator 25 (S28). The control program 35 then displays the token selecting screen on the display 23 in accordance with the screen definition information and the interface information (S29).

Figure 12A:
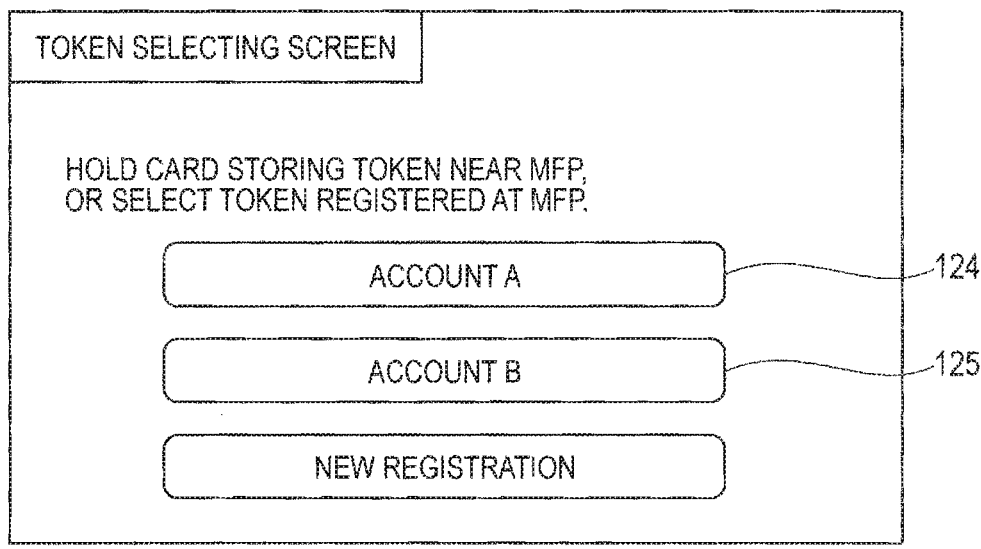

FIG. 12A is an example of a token selecting screen. The token selecting screen shown in FIG. 12A includes a message "Hold a card storing a token or select a token registered at the MFP", account icons 124, 125, and a [New registration] icon. A screen title, a message, texts indicative of options, and so on are defined by the screen definition information. Each of the account icons 124, 125 corresponds to the account record shown in FIG. 4A. The [New registration] icon corresponds to an instruction of causing the MFP 10 to acquire a new R token. The process of S29 is an example of a display process. The account icons 124, 125 are examples of an authentication information object. The token selecting screen is an example of an authentication-information selecting screen.

When the interface information indicates reception of the R token through the NFC communicator 26, the control program 35 controls the NFC communicator 26 to perform a Poll operation (S30). In response to approach of the card 70 to a distance where a polling signal can be received (S31), the control program 35 reads out the R token stored in the card 70 through the NFC communicator 26 (S32). That is, the card 70 transmits the R token stored in the storage 72 to the MFP 10 through the NFC communicator 73. The control program 35 of the MFP 10 receives the R token from the card 70 through the NFC communicator 26. When shortcut information associated with the R token is stored in the storage 72, this shortcut information is further read out in S32. The process of S32 executed by the card 70 is an example of a second near-field transmitting process. The process of S32 executed by the MFP 10 is an example of a first near-field receiving process.

On the other hand, although not shown in the drawings, in response to receiving a user operation of selecting one of the account icons 124, 125 through the operating IF 24, the control program 35 reads out the account record corresponding to this account icon from the account list shown in FIG. 4A. The selection of the account icon 124, 125 is an example of a selecting operation, and the process of receiving this selection is an example of a receiving process. The operation of holding the card 70 or the operation of selecting the account icon 124, 125 is an example of a service using operation. In the present embodiment, the following descriptions will be continued while assuming that the R token "0x2F6" is received from the card 70 in S32.

Next, the control program 35 transmits next-operation requesting information to the relay apparatus 80 through the Wi-Fi communicator 25 (S33). The next-operation requesting information of S33 is an HTTP request that is addressed to the next operation URL corresponding to acquisition of the R token by NFC communication. The next-operation requesting information includes the service usage information "service=A" and the R token "0x2F6". The process of S33 executed by the MFP 10 is an example of a usage-information transmitting process.

Next, the control program 95 of the relay apparatus 80 receives the next-operation requesting information from the MFP 10 through the communicator 85 (S33). Next, the control program 95 determines whether the next-operation requesting information includes all the information needed for generating communication instruction information. In response to determining that the next-operation requesting information includes all the information needed for generating the communication instruction information, the control program 95 transmits the R token "0x2F6" included in the next-operation requesting information and necessary service usage information to the service providing apparatus 110 through the communicator 85 (S34).

The service providing apparatus 110 receives the R token "0x2F6" and the necessary service usage information from the relay apparatus 80. The service providing apparatus 110 generates communication instruction information based on the received information, and transmits the generated communication instruction information to the relay apparatus 80 (S35). The communication instruction information includes, for example, an access URL indicative of transmission destination of the HTTP request for receiving a service A and an access token used for data communication for receiving the service A (hereinafter, referred to as "A token"). That is, the communication instruction information is information indicative of the method of data communication with the service providing apparatus 110.

Next, the control program 95 of the relay apparatus 80 receives the communication instruction information from the service providing apparatus 110 through the communicator 85 (S35). The control program 95 transmits the received communication instruction information to the MFP 10 through the communicator 85 (S36). The control program 95 may add a redirect URL and so on to the communication instruction information received in S35, and may transmit the redirect URL and so on and the communication instruction information in S36. The redirect URL is information indicative of the destination of reporting the result of the data communication process (S37). The process of S35 executed by the relay apparatus 80 is an example of a first acquiring process, and the process of S36 is an example of a communication instructing process.

Next, the control program 35 of the MFP 10 receives the communication instruction information from the relay apparatus 80 through the Wi-Fi communicator 25 (S36). The control program 35 then performs data communication with the service providing apparatus 110 by using the communication instruction information, in order to receive the service A (S37). Specifically, the control program 35 transmits, through the Wi-Fi communicator 25, the HTTP request that is addressed to the access URL included in the communication instruction information. A part or all of the data transmitted and received in S37 is encrypted and decrypted by the A token.

Scan upload which is an example of the service A will be described below. The service usage information "Service=A" indicates that the service providing apparatus 110 provides a service and that the provided service is scan upload. The scan upload requires other service usage information. The information indicative of a folder storing upload data and so on is an example of service usage information. In S27, when a part of service usage information is not included, out of all the information needed for generating the communication instruction information, the control program 95 transmits instruction information of instructing acquisition of this service usage information to the MFP 10 through the communicator 85. In this way, after transmission and reception of information for acquiring all the service usage information are repeated between the MFP 10 and the relay apparatus 80, in S28 token-acquisition instruction information is transmitted from the relay apparatus 80 to the MFP 10.

In S36, the control program 95 transmits communication instruction information of instructing a scan upload operation to the MFP 10. In response to receiving the communication instruction information of instructing a scan upload operation, the control program 35 controls the scanner 12 to perform a scan operation. The control program 35 encrypts image data generated by the scan operation by using the A token included in the communication instruction information, and transmits the HTTP request including the encrypted image data to the address shown by the access URL. In this case, between the processes of S25 and S33, for example, the control program 35 may further acquire service usage information for identifying a file name applied to this image data at the storage location and service usage information for identifying execution conditions of the scan operation (for example, resolution, data format, and so on).

As another example, in a case where the service A is download print, in S36 the control program 95 transmits the communication instruction information of instructing the download print operation to the MFP 10. In response to receiving the communication instruction information of instructing the download print operation, the control program 35 receives the encrypted image data indicated by the access URL from the service providing apparatus 110 through the Wi-Fi communicator 25 and decrypts this image data by using the A token. The control program 35 then controls the printer 11 to perform a recording operation for this image data. In this case, between the processes of S25 and S33, for example, the control program 35 may further acquire service usage information for identifying image data to be downloaded and service usage information for identifying execution conditions of the recording operation (for example, paper size, the number of copies, and so on).

In S34 the control program 85 of the relay apparatus 80 may further transmit service usage information for identifying the storage location of image data or service usage information for identifying image data to be downloaded, to the service providing apparatus 110 through the communicator 85. For example, the service providing apparatus 110 may generate an access URL based on these pieces of information. Further, for example, the service providing apparatus 110 may generate an A token based on the R token.

Here, transmitting the HTTP request to the destination shown by the access URL and encrypting/decrypting data transmitted/received in the data communication process by using the A token are examples of performing data communication by using the communication instruction information. Transmitting the R token to the relay apparatus 80 in order to acquire the communication instruction information needed for data communication is an example of performing data communication by using the R token. However, the transmitted/received data may be encrypted/decrypted by using the R token instead of the A token. The process of S36 is an example of a communication-instructing-information receiving process, and the process of S37 is an example of a data communication process.

Figure 7:
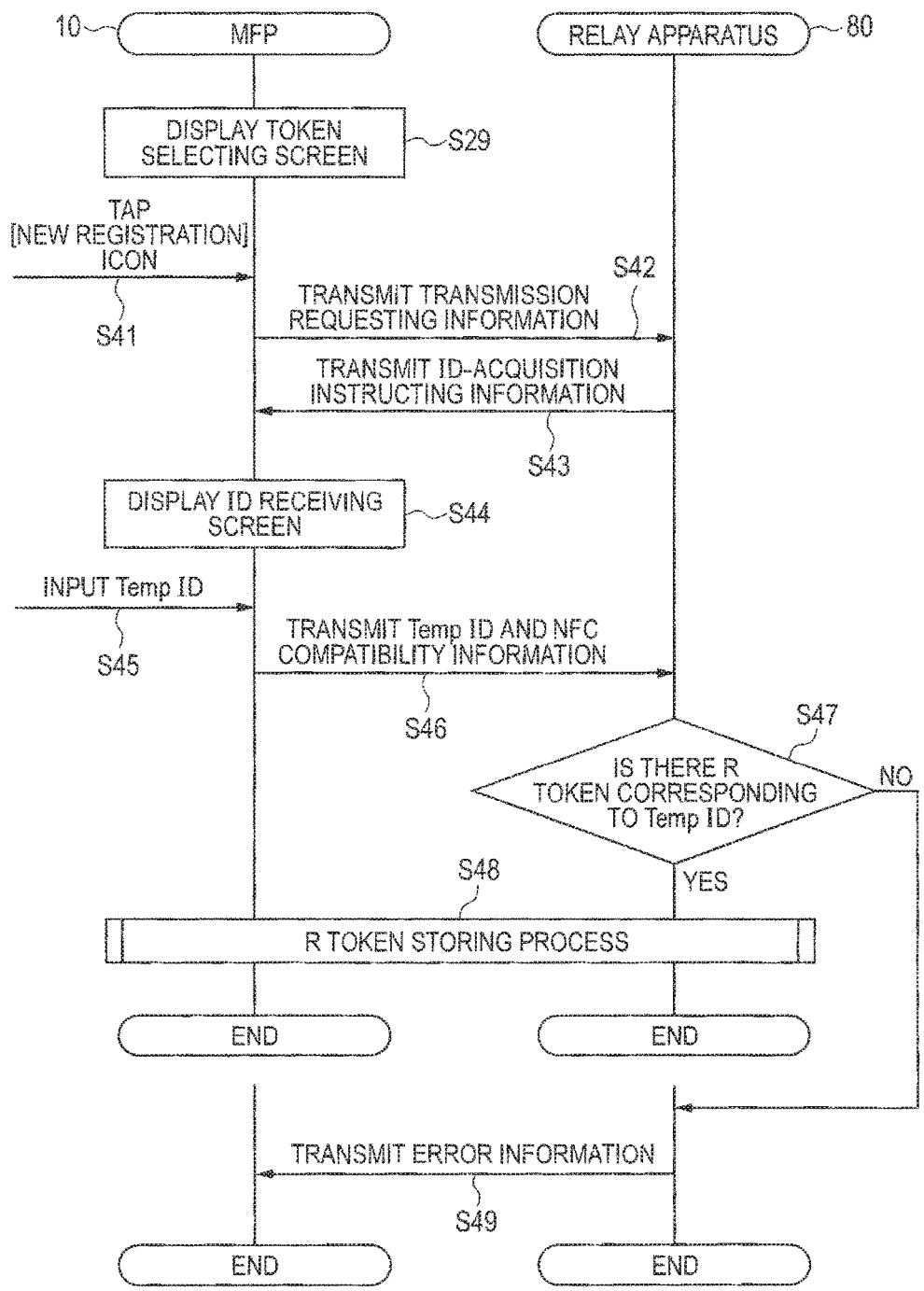
FIG. 7 is a flowchart showing the process of acquiring an R token stored in the relay apparatus 80 in association with a TempID.

Next, FIG. 7 shows a process of causing the MFP 10 to acquire a new R token. First, in response to receiving selection of the [New registration] icon in the token selecting screen through the operating IF 24 (S41), the control program 35 of the MFP 10 transmits transmission requesting information to the relay apparatus 80 through the Wi-Fi communicator 25 (S42). The transmission requesting information is information for requesting transmission of the R token. The transmission requesting information is an HTTP request that is addressed to the next operation URL corresponding to the [New registration] icon. The control program 35 temporarily stores, in the data storage area 32B, shortcut information including the service usage information that is acquired so far. This process is an example of a second acquiring process.

Next, the control program 95 of the relay apparatus 80 receives the transmission requesting information from the MFP 10 through the communicator 85 (S42). The control program 95 transmits ID-acquisition instructing information to the MFP 10 through the communicator 85 (S43). The ID-acquisition instructing information includes screen definition information for defining an ID receiving screen, interface information indicative of receiving selection of an icon included in the ID receiving screen through the operating IF 24, and next operation URL corresponding to each icon.

Figure 12B:
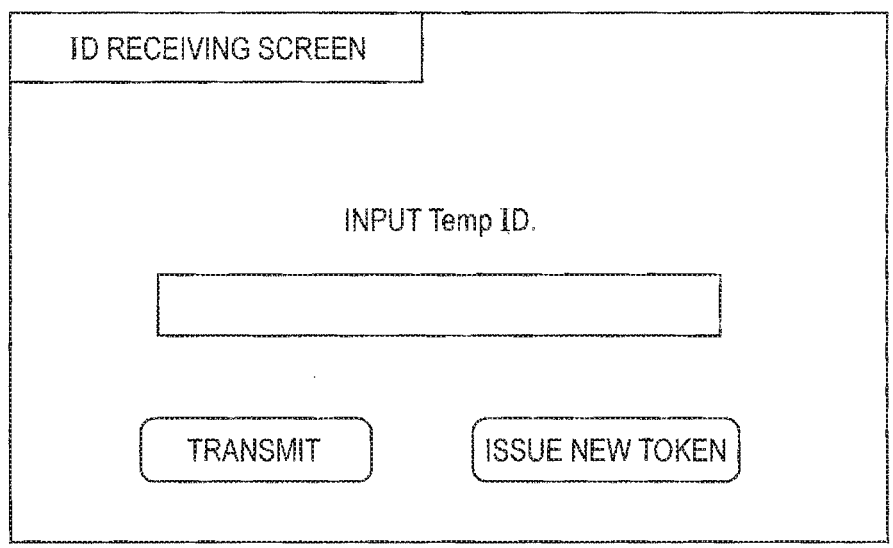

Next, the control program 35 of the MFP 10 receives the ID-acquisition instructing information from the relay apparatus 80 through the Wi-Fi communicator 25 (S43). The control program 35 then displays the ID receiving screen on the display 23 in accordance with the screen definition information and the interface information (S44). FIG. 12B is an example of the ID receiving screen. The ID receiving screen shown in FIG. 12B includes a message "Input TempID", a text box that displays the TempID inputted through the operating IF 24, a [Transmit] icon, and a [New issue] icon. The screen title, the message, the text box, the icon and so on are defined in the screen definition information.

The control program 35 receives input of the TempID and selection of the icon through the operating IF 24 in accordance with the interface information (S45, S51). The process of S45, S51 is an example of a receiving process. The input of the TempID is an example of an input operation. In response to receiving input of the TempID and selection of the [Transmit] icon through the operating IF 24(S45), the control program 35 transmits the TempID and the NFC compatibility information to the relay apparatus 80 through the Wi-Fi communicator 25 (S46).

For example, the TempID transmitted in S46 is information that is displayed on the display of the information processing terminal 40 in S19 of FIG. 5 and that is inputted through the operating IF 24 in S45. The NFC compatibility information transmitted in S46 is information indicative of whether the MFP 10 is configured to perform NFC communication. In the present embodiment, the TempID "1234" and the NFC compatibility information indicating that NFC communication can be performed are transmitted. The process of S46 executed by the MFP 10 is an example of an identification-information transmitting process.

Next, the control program 95 of the relay apparatus 80 receives the TempID and the NFC compatibility information from the MFP 10 through the communicator 85 (S46). The control program 95 then determines whether the data storage area 92B stores the R token associated with the received TempID (S47). In other words, the control program 95 determines whether the token list shown in FIG. 4C includes a token record including the TempID "1234". The process of S46 executed by the relay apparatus 80 is an example of an identification-information receiving process. The process of S47 is an example of a fifth determining process.

In response to determining that the data storage area 92B does not store the R token associated with the received TempID (S47: No), the control program 95 transmits error information to the MFP 10 through the communicator 85 (S49). The error information is information indicating that there is no R token corresponding to the TempID. Although not shown in the drawings, the control program 35 of the MFP 10 receives error information from the relay apparatus 80 through the Wi-Fi communicator (S49). The control program 35 may display a message "TempID is wrong." or the like, on the display 23.

On the other hand, in response to determining that the data storage area 92B stores the R token "0x3DB" associated with the TempID "1234" (S47: Yes), the control program 95 executes an R token storing process (S48). The R token storing process is a process of storing the R token held by the relay apparatus 80 in the MFP 10 or in the card 70. The details of the R token storing process will be described while referring to FIGS. 9 and 10.

First, the control program 95 determines, based on the NFC compatibility information received in S46, whether the MFP 10 is configured to perform NFC communication (S61). In response to determining that the MFP 10 is configured to perform NFC communication (S61: Yes), the control program 95 transmits storage-location selection instructing information to the MFP 10 through the communicator 85 (S62). The storage-location selection instructing information includes screen definition information for defining a storage-location selecting screen, interface information indicative of receiving selection of an icon included in the storage-location selecting screen through the operating IF 24, and a next operation URL corresponding to each icon.

Figure 13A:
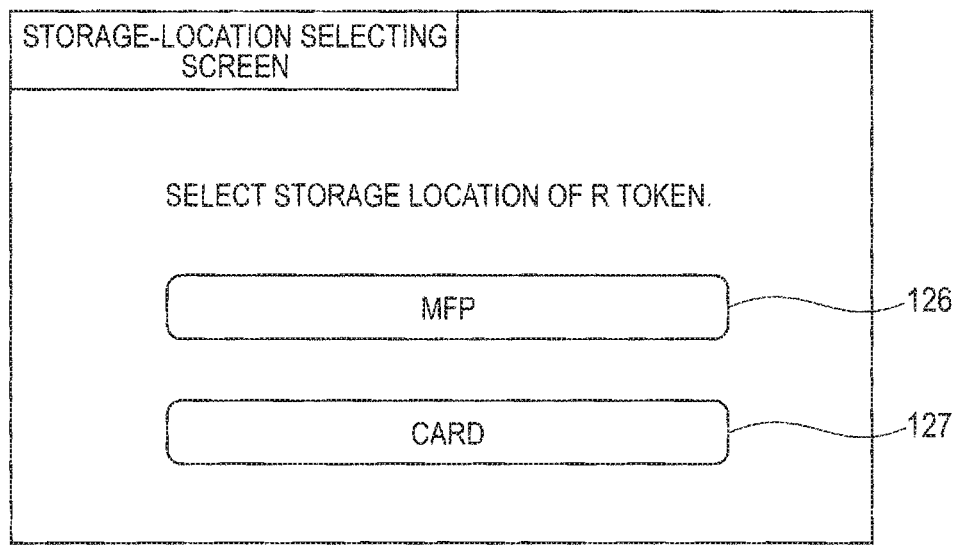

Next, the control program 35 of the MFP 10 receives the storage-location selection instructing information from the relay apparatus 80 through the Wi-Fi communicator 25 (S62). The control program 35 then displays the storage-location selecting screen on the display 23 in accordance with the screen definition information and the interface information (S63). FIG. 13A shows an example of the storage-location selecting screen. The storage-location selecting screen shown in FIG. 13A includes a message "Select the storage location of the R token" and a plurality of storage location icons 126, 127. Texts and so on indicative of the screen title, the message, and the option are defined in the screen definition information. The storage location icon 126 corresponds to the storage 32 of the MFP 10. The storage location icon 127 corresponds to the storage 72 of the card 70.

The control program 35 receives selection of one of the storage location icons 126, 127 through the operating IF 24 (S64). The process of S64 is an example of the receiving process. Selection of the storage location icons 126, 127 is one example of a first specifying operation of specifying the storage location of the R token. In response to receiving selection of one of the storage location icons 126, 127 through the operating IF 24 (S64), the control program 35 transmits storage-location specifying information to the relay apparatus 80 through the Wi-Fi communicator 25 (S65).

The storage-location specifying information is information indicative of the storage 32, 72 corresponding to the storage location icon 126, 127 selected in S64. In the present embodiment, the following descriptions will be continued while assuming that the storage location icon 127 is selected. That is, the storage-location specifying information of the present embodiment indicates that the storage 72 of the card 70 is specified as the storage location. The storage-location specifying information is an HTTP request that is addressed to the next operation URL corresponding to the storage location icon 127. The process of S65 is an example of the storage-location specifying process.

Next, the control program 95 of the relay apparatus 80 receives the storage-location specifying information from the MFP 10 through the communicator 85 (S65). Next, the control program 95 determines which of the MFP 10 and the card 70 is specified by the storage-location specifying information (S66). The process of S65 executed by the relay apparatus 80 is an example of a storage-location specifying information receiving process. The process of S66 is an example of a first determining process.

In response to determining that the card 70 is specified by the storage-location specifying information (S66: Yes), the control program 95 transmits card-information acquisition instructing information to the MFP 10 through the communicator 85 (S67). The card-information acquisition instructing information is information for instructing acquisition of card information of the card 70 in which the R token is to be stored. The card-information acquisition instructing information includes screen definition information for defining a near-field waiting screen, interface information indicative of receiving card information through the NFC communicator 26, and a next operation URL. The process of S67 executed by the relay apparatus 80 is an example of a card-information acquisition instructing process.

Figure 13B:
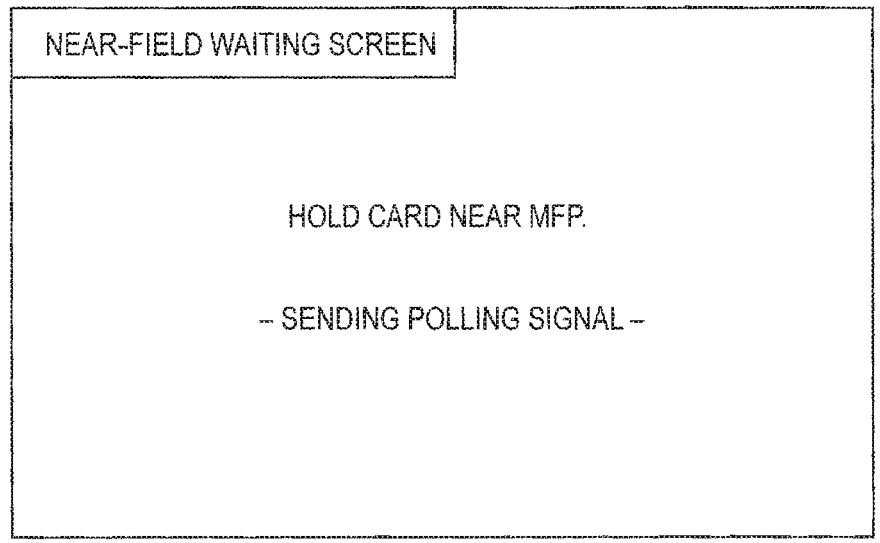

Next, the control program 35 of the MFP 10 receives the card-information acquisition instructing information from the relay apparatus 80 through the Wi-Fi communicator 25 (S67). The control program 35 then displays the near-field waiting screen on the display 23 in accordance with the screen definition information and the interface information (S68). FIG. 13B shows an example of the near-field waiting screen. The near-field waiting screen shown in FIG. 13B includes a message "Hold a card near the MFP.—Polling signal is being sent out—". The screen title, the message, and so on are defined by the screen definition information. The process of S67 executed by the MFP 10 is an example of a card-information acquisition instruction receiving process.

Next, when the interface information indicates reception of the R token through the NFC communicator 26, the control program 35 controls the NFC communicator 26 to perform a Poll operation (S69). In response to approach of the card 70 to a distance where a polling signal can be received (S70), the control program 35 reads out the card information stored in the card 70 through the NFC communicator 26 (S71). That is, the card 70 transmits the card information stored in the storage 72 to the MFP 10 through the NFC communicator 73. The control program 35 of the MFP 10 receives the card information from the card 70 through the NFC communicator 26. The process of S71 executed by the card 70 is an example of a third near-field transmitting process, and the process of S71 executed by the MFP 10 is an example of a third near-field receiving process.

Next, the control program 35 transmits the card information acquired in S71 to the relay apparatus 80 through the Wi-Fi communicator 25 (S72). The card information is an HTTP request that is addressed to the next operation URL included in the card-information acquisition instructing information. The process of S72 executed by the MFP 10 is an example of a card-information transmitting process.

Next, the control program 95 of the relay apparatus 80 receives the card information from the MFP 10 through the communicator 85 (S72). Next, the control program 95 determines whether the card 70 is configured to store the R token, based on type information included in the card information (S73). The control program 95 determines whether the number of storing R tokens (number of registrations) reaches a threshold, based on the storage-number information included in the card information (S74). The process of S72 executed by the relay apparatus 80 is an example of a card-information receiving process. The process of S73 is an example of a second determining process. The process of S74 is an example of a third determining process. The threshold in S74 is 1, for example.

In response to determining that the card 70 is configured to store the R token and that the number of storing R tokens is smaller than the threshold (S73: Yes & S74: No), the control program 95 transmits R token transmission instructing information to the MFP 10 through the communicator 85 (S80). The process of S80 executed by the relay apparatus 80 is an example of a first storage instructing process.

The R token transmission instructing information is information for instructing storing the R token in the card 70. In other words, the R token transmission instructing information is information for instructing transmission of the R token to the card 70 by NFC communication. The R token transmission instructing information includes screen definition information for defining the near-field waiting screen, interface information indicative of transmission of the R token through the NFC communicator 26, and the R token. The R token transmission instructing information is an example of a first storage instructing information.

Next, the control program 35 of the MFP 10 receives the R token transmission instructing information from the relay apparatus 80 through the Wi-Fi communicator 25 (S80). The control program 35 displays the near-field waiting screen shown in FIG. 13B on the display 23, in accordance with the screen definition information and the interface information (S81). When the interface information indicates reception of the R token through the NFC communicator 26, the control program 35 controls the NFC communicator 26 to perform a Poll operation (S82). The process of S80 executed by the MFP 10 is an example of a storage-instruction receiving process.

In response to approach of the card 70 to a distance where a polling signal can be received (S83), the control program 35 writes the R token included in the R token transmission instructing information in the card 70 (S84). When shortcut information is temporarily stored in S42, this shortcut information is further written to the card 70. That is, the control program 35 of the MFP 10 transmits the R token to the card 70 through the NFC communicator 25. The card 70 receives the R token from the MFP 10 through the NFC communicator 73. The process of S84 executed by the MFP 10 is an example of a first near-field transmitting process, and the process of S84 executed by the card 70 is an example of a second near-field receiving process.

The card 70 stores the received R token in the storage 72. When the number of storing R tokens is smaller than the threshold, the card 70 adds (stores) this R token to the storage 72. On the other hand, when the number of storing R tokens reaches the threshold, the card 70 replaces (overwrites) the already-stored R token with the received R token. The process of storing the R token in the storage 72 is an example of a first storing process.

On the other hand, in response to determining that the card 70 is configured to store the R token and that the number of storing R tokens reaches threshold (S73: Yes & S74: Yes), the control program 95 transmits overwriting-confirmation instructing information to the MFP 10 through the communicator 85 (S75). The process of S75 executed by the relay apparatus 80 is an example of an overwriting-confirmation instructing process.

The overwriting-confirmation instructing information is information for instructing confirmation of whether to replace (overwrite) the R token already stored in the card 70 (hereinafter, referred to as "old R token") with the R token acquired in S13 (hereinafter, referred to as "new R token"). The overwriting-confirmation instructing information includes screen definition information for defining an overwriting confirmation screen, interface information indicative of receiving selection of an icon included in the overwriting confirmation screen through the operating IF 24, and a next operation URL corresponding to each icon.

Figure 14A:
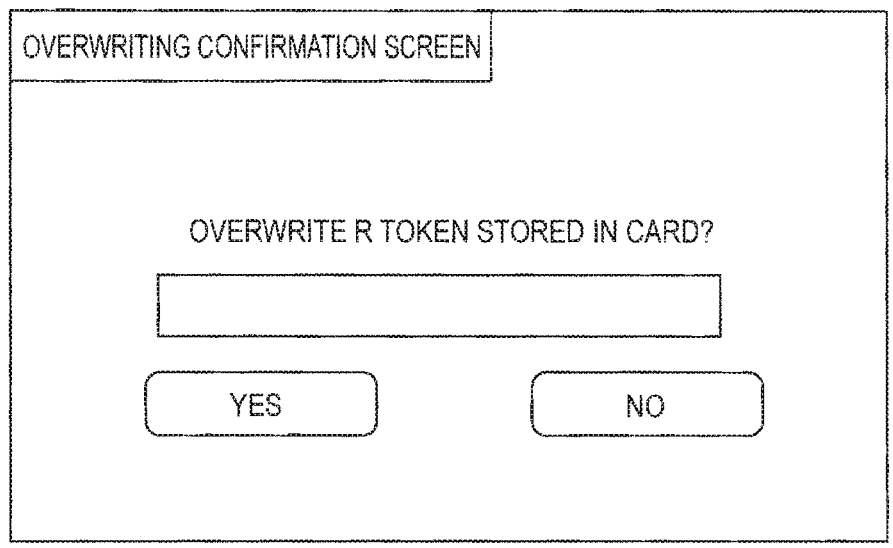

Next, the control program 35 of the MFP 10 receives the overwriting-confirmation instructing information from the relay apparatus 80 through the Wi-Fi communicator 25 (S75). The process of S75 executed by the MFP 10 is an example of an overwriting-confirmation instruction receiving process. The control program 35 displays an overwriting confirmation screen on the display 23 in accordance with the screen definition information and the interface information (S76). FIG. 14A is an example of the overwriting confirmation screen. The overwriting confirmation screen shown in FIG. 14A includes a message "Overwrite the R token stored in the card?", a [Yes] icon, and a [No] icon. The screen title, the message, the icon, and so on are defined in the screen definition information. The [Yes] icon corresponds to permission of overwriting, and the [No] icon corresponds to rejection of overwriting. Hereinafter, the [Yes] icon and the [No] icon may be collectively referred to as "confirmation icon".

The control program 35 receives selection of one of the confirmation icons through the operating IF 24 (S77). The process of S77 is an example of the receiving process. Selection of the confirmation icons is an example of a second specifying operation of specifying whether to perform overwriting. In response to receiving selection of one of the confirmation icons through the operating IF 24, the control program 35 transmits overwriting confirmation information to the relay apparatus 80 through the Wi-Fi communicator 25 (S78). The process of S78 executed by the MFP 10 is an example of a storage-location specifying process.

The overwriting confirmation information is information indicative of whether to permit replacing (overwriting) the old R token with the new R token. That is, the overwriting confirmation information in a case where the [Yes] icon is selected indicates permission of overwriting. On the other hand, the overwriting confirmation information in a case where the [No] icon is selected indicates rejection of overwriting. The overwriting confirmation information is an HTTP request that is addressed to the next operation URL corresponding to the selected confirmation icon.

Next, the control program 95 of the relay apparatus 80 receives the overwriting confirmation information from the MFP 10 through the communicator 85 (S78). Next, the control program 95 determines whether it is permitted to replace the old R token with the new R token, based on the overwriting confirmation information (S79). The process of S78 executed by the relay apparatus 80 is an example of an overwriting confirmation information receiving process. The process of S79 is an example of a fourth determining process.

In response to determining that overwriting is permitted (S79: Yes), the control program 95 executes the processes of S80 and thereafter shown in FIG. 10. On the other hand, in response to determining that overwriting is rejected (S79: No), the control program 95 transmits error information to the MFP 10 through the communicator 85 (S89). The error information is information indicating that the card 70 cannot store the new R token. The error information includes screen definition information for defining an error screen, and interface information indicative of receiving selection of the icon in the error screen through the operating IF 24. The process of S89 executed by the relay apparatus 80 is an example of an error instructing process.

Figure 10:
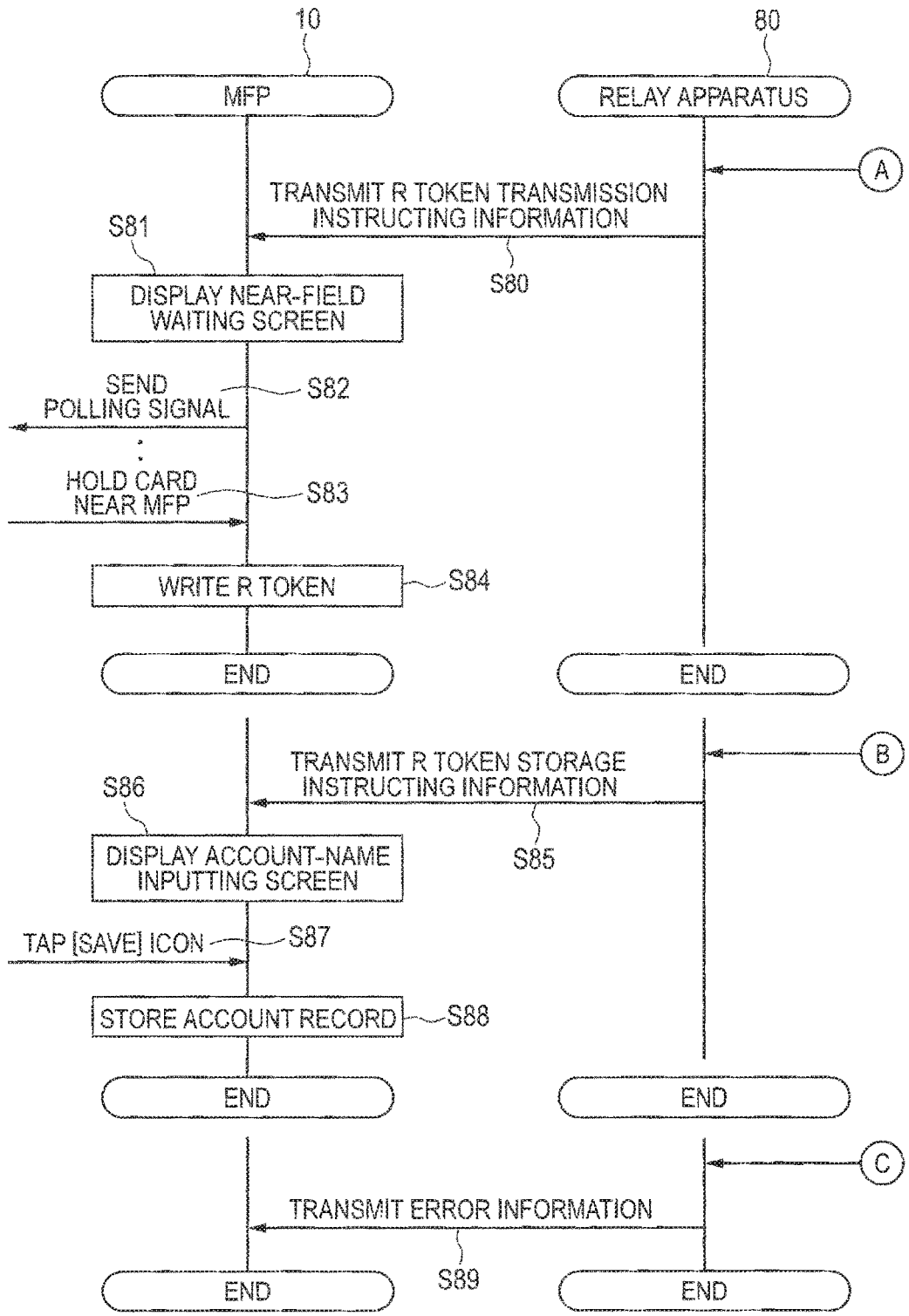
FIG. 10 is a flowchart showing a second half of the R token storing process.

Although not shown in the drawings, the control program 35 of the MFP 10 receives error information from the relay apparatus 80 through the Wi-Fi communicator 25 (S89). The control program 35 may display the error screen on the display 23 in accordance with the screen definition information and the interface information, thereby notifying the user that new R token cannot be stored in the card 70. The process of S89 shown in FIG. 10 is also executed when the control program 95 determines that the card 70 cannot store the R token in S73.

On the other hand, in response to determining that the MFP 10 is not configured to perform NFC communication (S61: No), or in response to determining that the MFP 10 is specified by the storage-location specifying information (S66: No), the control program 95 of the relay apparatus 80 transmits R token storage instructing information to the MFP 10 through the communicator 85 (S85). The R token storage instructing information is information for instructing storing the R token in the MFP 10. The R token storage instructing information includes screen definition information for defining an account-name inputting screen, interface information indicative of receiving input of an account name through the operating IF 24, and an R token. The R token storage instructing information is an example of a second storage instructing information. The process of S85 executed by the relay apparatus 80 is an example of a second storage instructing process.

Figure 14B:
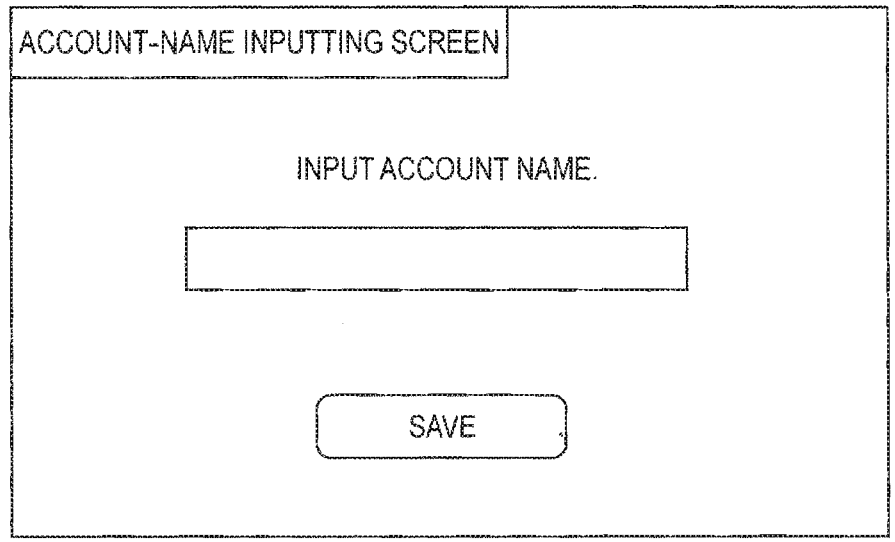

Next, the control program 35 of the MFP 10 receives the R token storage instructing information from the relay apparatus 80 through the Wi-Fi communicator 25 (S85). The process of S85 executed by the MFP 10 is an example of a storage-instruction receiving process. The control program 35 displays the account-name inputting screen on the display 23 in accordance with the screen definition information and the interface information (S86). FIG. 14B is an example of an account-name inputting screen. The account-name inputting screen shown in FIG. 14B includes a message "Input account name", a text box that displays the account name inputted through the operating IF 24, and a [Save] icon. The screen title, the message, the text box, the icon, and so on are defined by the screen definition information.

The control program 35 receives input of an account name and selection of the [Save] icon through the operating IF 24 (S87). The process of S87 is an example of the receiving process. In response to receiving input of the account name and selection of the [Save] icon through the operating IF 24 (S87), the control program 35 adds an account record to the account list shown in FIG. 4A (S88). The account record added in S88 includes the account name inputted in S87, the R token included in the R token storage instructing information received in S85, and the shortcut information temporarily stored in S42. The process of S88 is an example of a second storing process.

Figure 8:
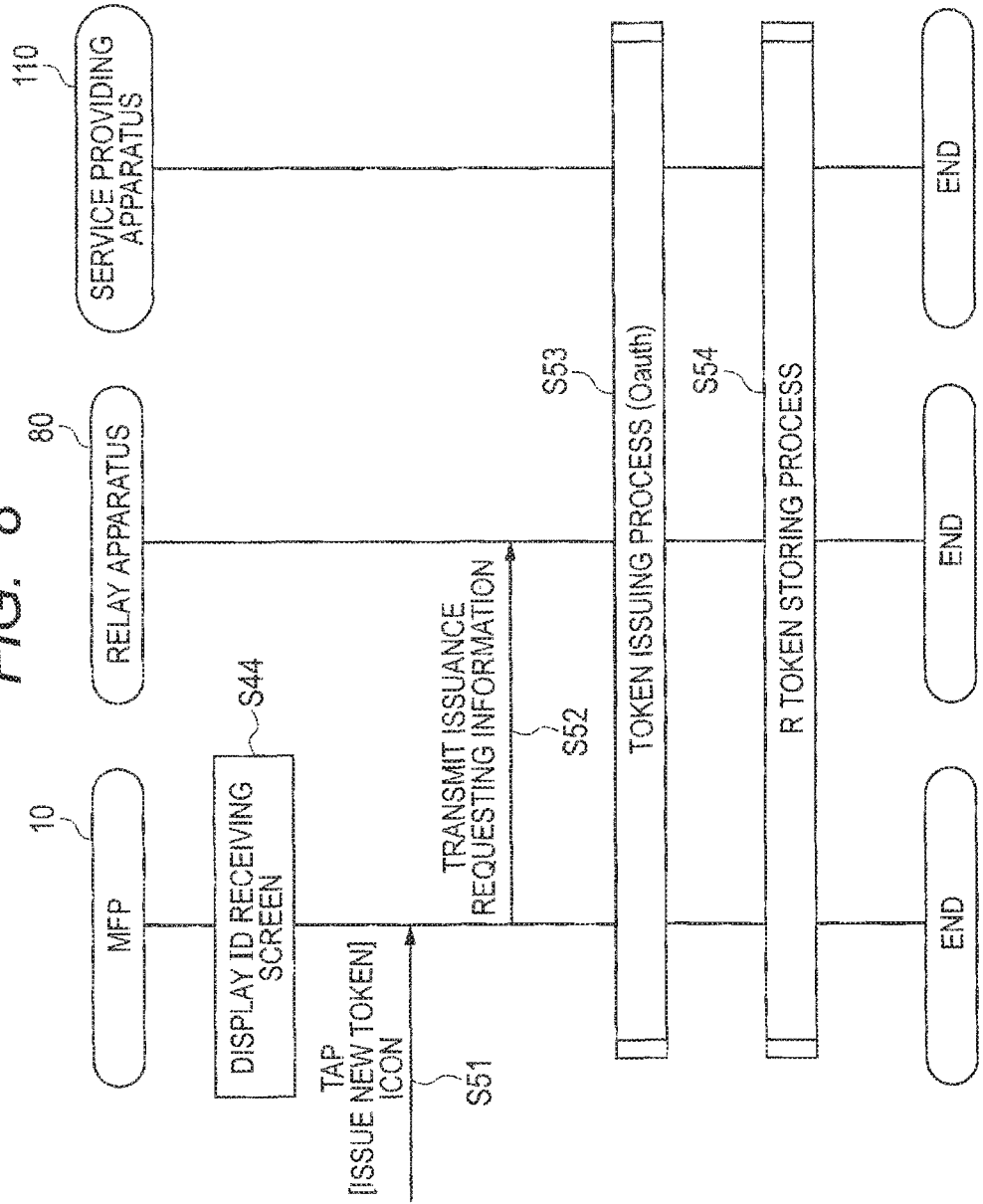
FIG. 8 is a flowchart showing the process of causing the service providing apparatus 110 to issue an R token through the MFP 10.
Figure 9:
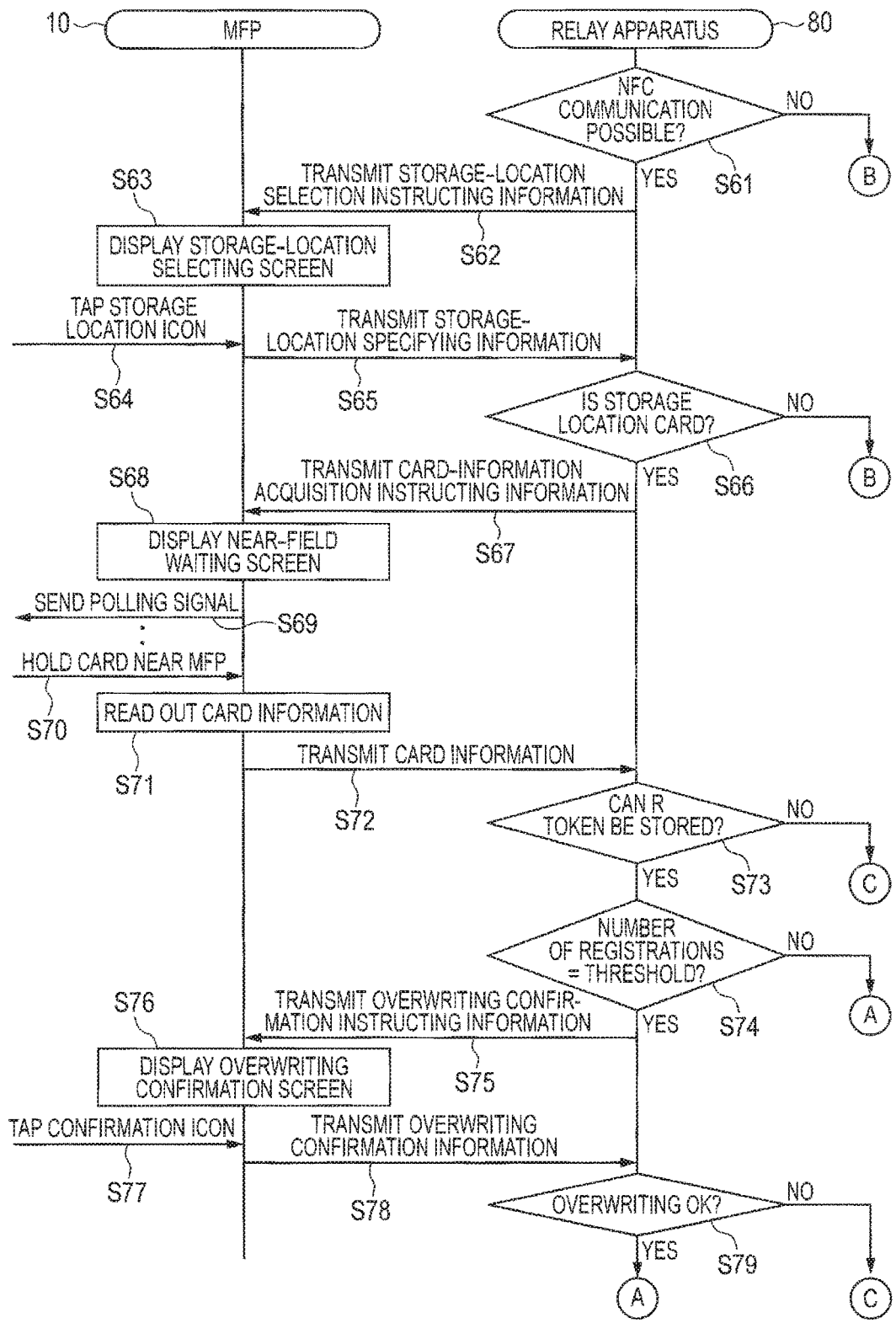
FIG. 9 is a flowchart showing a first half of an R token storing process.

Next, FIG. 8 shows a process of requesting the service providing apparatus 110 to issue a new R token. First, in response to receiving selection of the [New issue] icon in the ID receiving screen through the operating IF 24 (S51), the control program 35 of the MFP 10 transmits issuance requesting information to the relay apparatus 80 through the Wi-Fi communicator 25 (S52). The issuance requesting information transmitted by the MFP 10 includes NFC compatibility information indicating that the apparatus is configured to perform NFC communication, and apparatus information indicating that the apparatus is an image forming apparatus. The issuance requesting information of S52 is an HTTP request that is addressed to the next operation URL corresponding to the [New issue] icon. Selection of the [New issue] icon is an example of an instruction operation of instructing execution of a preparing process for connecting the MFP 10 to the service providing apparatus 110. The process of S52 executed by the MFP 10 is an example of an issuance-requesting-information transmitting process.

Next, the control program 95 of the relay apparatus 80 receives the issuance requesting information from the MFP 10 through the communicator 85 (S52). The process of S52 executed by the relay apparatus 80 is an example of an issuance-request receiving process. The control program 95 then executes a token issuing process (S53) and an R token storing process (S54). The process of S53 is the same as the process of S13, and the process of S54 is the same as the process of S48. With these processes, the R token issued in S53 is stored in the MFP 10 or in the card 70.

[Operations and Effects of the Present Embodiment]

According to the above-described embodiment, the R token issued by the service providing apparatus 110 in the token issuing process is stored in the card 70. By simply holding the card 70 near the MFP 10, a user can use services provided by the service providing apparatus 110 through the MFP 10. This results in simplifying the user operation for accessing the service providing apparatus 110 using the MFP 10. Further, by storing the R token in the card 70 having high portability, in an environment where a plurality of the MFPs 10 is installed, a user can easily access the service providing apparatus 110 through each MFP 10.

According to the above-described embodiment, it is prevented that a new R token is further written to the card 70 in which the storage number reaches the threshold. For example, the threshold may be one (1). That is, a user may prepare a plurality of the cards 70 each storing only one R token and may hold, near the MFP 10, the card 70 corresponding to the service which the user wishes to use. With this operation, when the user holds the card 70 near the MFP 10 in order to use a service, it is possible to skip the step of having the user select one of the R tokens stored in the card 70.

According to the above-described embodiment, a user is inquired about whether to discard an old R token and to store a new R token in the card 70. With this process, overwriting of a necessary old R token is prevented, and an unnecessary old R token is discarded and the card 70 can be reused. In recent years, the card 70 compatible with NFC communication is used with various uses. As in the above-described embodiment, by preliminarily inquiring whether the card 70 can be used in the communication system 100, it is prevented that an R token is written in the card 70 that is used for another use.

According to the above-described embodiment, a user can select one of the MFP 10 and the card 70 as the storage location of the R token. The user also can select, through the token selecting screen, which of the R token stored in the card 70 and the R token stored in the MFP 10 is used to use a service. As one example, the R token corresponding to a service that is only used through a particular MFP 10 may be stored in the particular MFP 10. As another example, the R token corresponding to a service that can be used through a plurality of the MFPs 10 may be stored in the card 70.

According to the above-described embodiment, when the relay apparatus 80 is controlled to execute the token issuing process through the information processing terminal 40 that is not compatible with NFC communication, the information processing terminal 40 is notified about the TempID associated with the R token issued by the service providing apparatus 110. By transmitting this TempID to the relay apparatus 80 through the MFP 10, the R token associated with the TempID can be stored in the MFP 10 or in the card 70.

While the disclosure has been described in detail with reference to the above aspects thereof, it would be apparent to those skilled in the art that various changes and modifications may be made therein without departing from the scope of the claims.

The sequence of processes and screen transitions are not limited to the examples provided in the above-described embodiment. As one example, a process of acquiring service usage information may be further executed after S33. As another example, a process of generating shortcut information stored in association with an R token may be executed in the R token storing process.

In the above-described embodiment, in S32, an example is described in which the R token associated with no shortcut information is read out from the card 70. On the other hand, when the R token acquired from the card 70 or the data storage area 32B is associated with shortcut information, in S33 the control program 35 of the MFP 10 may transmit the next-operation requesting information including service usage information included in this shortcut information, as the HTTP request that is addressed to the next operation URL included in this shortcut information. With this process, a part of the process of receiving input of the service usage information can be omitted. Consequently, operations of a user in a routine data communication process can be simplified.

In the above-described embodiment, an example is described in which the token issuing process is executed, which is triggered by transmission of issuance requesting information from the MFP 10 or the information processing terminal 40. However, the transmission source of the issuance requesting information is not limited to the MFP 10 or the information processing terminal 40, but may be the mobile terminal 50. That is, the control program 65 of the mobile terminal 50 may execute the process of the MFP 10 shown in FIG. 8. The issuance requesting information transmitted by the mobile terminal 50 includes NFC compatibility information indicating that the apparatus is configured to perform NFC communication, and apparatus information indicating that the apparatus is not an image forming apparatus. Also, the mobile terminal 50 may execute the processes of the MFP 10 shown in FIG. 10. Further, the mobile terminal 50 may execute the processes of the information processing terminal 40 shown in FIG. 5.

In the above-described embodiment, an example is described in which, when the interface information indicates execution of NFC communication, the NFC communicator 26 starts the Poll operation. However, the control program 35 of the MFP 10 may control the NFC communicator 26 to perform the Poll operation continuously while the MFP 10 is supplied with electric power. In this case, simply by holding the card 70 near the MFP 10 without operating the operating IF 24 of the MFP 10, the user can use a service provided by the service providing apparatus 110 through the MFP 10.

In the above-described embodiment, in S32 the control program 35 of the MFP 10 may further read out type information from the card 70 and may determine, based on the type information, whether this card 70 is usable in the communication system 100. Also, in response to determining that this card 70 is usable in the communication system 100, the control program 35 may execute the processes of S33 and thereafter. With this process, it is prevented that information read out from a card used for another use is transmitted to the relay apparatus 80.

An example is described in which the CPUs 31, 61, and 91 execute various programs stored in the program storage areas 32A, 62A, and 92A of the storage 32, 62, and 92 in the MFP 10, the mobile terminal 50, and the relay apparatus 80 of each embodiment, thereby realizing each process executed by the processor of this disclosure. However, the configuration of the processor is not limited to this, and a part or an entirety of the processor may be realized by hardware such as an IC (Integrated Circuit) and so on.

This disclosure may be realized not only as the MFP 10, the mobile terminal 50, and the relay apparatus 80 but also as a program for controlling the MFP 10, the mobile terminal 50, and the relay apparatus 80 to execute processes. This program may be provided by a non-transitory recording medium. In addition to a CD-ROM, a DVD-ROM, and so on, a non-transitory recording medium may include a storage mounted on a server configured to be connected to the MFP 10, the mobile terminal 50, and the relay apparatus 80 through a communication network. The program stored in the storage of the server may be delivered through a communication network such as Internet, as information or signals indicative of this program.

What is claimed is:

1. A communication system comprising an image processing apparatus, a storage, and a server on Internet, the communication system being configured to receive a service from a service providing apparatus on the Internet,
the image processing apparatus comprising:
an image forming device configured to form an image;
a first communication interface;
a second communication interface;
an operating interface;
an apparatus processor; and
an apparatus memory storing instructions, the instructions, when executed by the apparatus processor, causing the image processing apparatus to:
execute a receiving process of receiving a user operation through the operating interface;
in response to receiving an instruction operation in the receiving process, execute an apparatus-side preparing process including:
an issuance requesting process of transmitting issuance requesting information to the server through the first communication interface and through the Internet, the issuance requesting information being information for requesting issuance of authentication information indicative of authority to perform data communication with the service providing apparatus, the instruction operation being a user operation of instructing execution of a preparing process for connecting the image processing apparatus to the service providing apparatus;

a storage-instruction receiving process of receiving storage instructing information from the server through the first communication interface and through the Internet, the storage instructing information being information including the authentication information issued by the service providing apparatus; and a first transmitting process of, in response to detection of the storage through the second communication interface, transmitting the authentication information included in the storage instructing information to the storage through the second communication interface;

in response to detection of a storage storing the authentication information through the second communication interface, execute a service usage process including:

a first receiving process of receiving the authentication information from the storage through the second communication interface; and a data communication process of performing data communication with the service providing apparatus through the first communication interface and through the Internet by using the authentication information, the storage comprising:
a storage communication interface;
a storage processor; and
a storage memory storing instructions, the instructions, when executed by the storage processor, causing the storage to:
in response to detection of the image processing apparatus through the storage communication interface, execute a storage-side preparing process including:
a second receiving process of receiving the authentication information from the image processing apparatus through the storage communication interface; and
a first storing process of storing the received authentication information in the storage memory; and
in response to determining that the authentication information is stored in the storage memory and to detection of the image processing apparatus through the storage communication interface, execute a second transmitting process of transmitting the authentication information stored in the storage memory to the image processing apparatus through the storage communication interface, the server comprising:
a server communication interface;
a server processor; and
a server memory storing instructions, the instructions, when executed by the server processor, causing the server to:
execute an issuance-request receiving process of receiving the issuance requesting information from the image processing apparatus through the server communication interface and through the Internet; and
in response to receiving the issuance requesting information, execute a server-side preparing process including:

an authentication-information receiving process of receiving the authentication information from the service providing apparatus through the server communication interface and through the Internet; and a storage instructing process of transmitting the storage instructing information to the image processing apparatus through the server communication interface and through the Internet.

2. The communication system according to claim 1, wherein the apparatus-side preparing process includes:
a storage-location specifying process of, in response to receiving a first specifying operation of specifying a storage location of the authentication information in the receiving process, transmitting, to the server through the first communication interface, storage-location specifying information indicative of the storage location specified by the first specifying operation;

wherein the apparatus memory further stores instructions, the instructions, when executed by the apparatus processor, causing the image processing apparatus to:
in response to receiving first storage instructing information in the storage-instruction receiving process, execute the first transmitting process, the first storage instructing information including the authentication information, the first storage instructing information being the storage instructing information of instructing storing the authentication information in the storage; and in response to receiving second storage instructing information in the storage-instruction receiving process, execute a second storing process of storing the authentication information included in the second storage instructing information in the apparatus memory, the second storage instructing information including the authentication information, the second storage instructing information being the storage instructing information of instructing storing the authentication information in the image processing apparatus;

wherein the server-side preparing process includes:
a storage-location specifying information receiving process of receiving the storage-location specifying information from the image processing apparatus through the server communication interface; and
a first determining process of determining which of the storage and the image processing apparatus is specified by the storage-location specifying information; and wherein the server memory further stores instructions, the instructions, when executed by the server processor, causing the server to:
in response to determining in the first determining process that the storage is specified, transmit the first storage instructing information to the image processing apparatus through the server communication interface; and
in response to determining in the first determining process that the image processing apparatus is specified, transmit the second storage instructing information to the image processing apparatus through the server communication interface.

3. The communication system according to claim 2, wherein the server-side preparing process includes:
a storage-information acquisition instructing process of, in response to determining in the first determining process that the storage is specified, transmitting storage-information acquisition instructing information to the image processing apparatus through the server communication interface, the storage-information acquisition instructing information being information of instructing acquisition of type information indicative of whether the storage is configured to store the authentication information;

a storage-information receiving process of receiving the type information from the image processing apparatus through the server communication interface; and a second determining process of determining, based on the type information, whether the storage is configured to store the authentication information;

wherein the server memory further stores instructions, the instructions, when executed by the server processor, causing the server to:

in response to determining in the second determining process that the storage is configured to store the authentication information, execute the storage instructing process of transmitting the first storage instructing information to the image processing apparatus through the server communication interface; and in response to determining in the second determining process that the storage is not configured to store the authentication information, execute an error instructing process of transmitting, to the image processing apparatus through the server communication interface, error information indicating that the storage is not configured to store the authentication information;

wherein the apparatus-side preparing process includes:

a storage-information acquisition instruction receiving process of receiving the storage-information acquisition instructing information from the server through the first communication interface;

a third receiving process of, in response to detection of the storage through the second communication interface, receiving the type information from the storage through the second communication interface; and a storage-information transmitting process of transmitting the type information to the server through the first communication interface; and wherein the storage-side preparing process includes a third transmitting process of, in response to detection of the image processing apparatus through the storage communication interface, transmitting the type information to the image processing apparatus through the storage communication interface.

4. The communication system according to claim 2, wherein the authentication information received in the authentication-information receiving process is new authentication information;

wherein the authentication information already stored in the storage is old authentication information;

wherein the server-side preparing process includes:

a storage-information acquisition instructing process of, in response to determining in the first determining process that the storage is specified, transmitting storage-information acquisition instructing information to the image processing apparatus through the server communication interface, the storage-information acquisition instructing information being information of instructing acquisition of storage-number information indicative of a number of the old authentication information;

a storage-information receiving process of receiving the storage-number information from the image processing apparatus through the server communication interface; and a third determining process of determining whether a storage number indicated by the storage-number information reaches a threshold;

wherein the server memory further stores instructions, the instructions, when executed by the server processor, causing the server to:

in response to determining in the third determining process that the storage number is smaller than the threshold, execute the storage instructing process of transmitting the first storage instructing information to the image processing apparatus through the server communication interface;

wherein the apparatus-side preparing process includes:

a storage-information acquisition instruction receiving process of receiving the storage-information acquisition instructing information from the server through the first communication interface;

a third receiving process of, in response to detection of the storage through the second communication interface, receiving the storage-number information from the storage through the second communication interface; and a storage-information transmitting process of transmitting the storage-number information to the server through the first communication interface;

wherein the storage-side preparing process includes a third transmitting process of, in response to detection of the image processing apparatus through the storage communication interface, transmitting the storage-number information to the image processing apparatus through the storage communication interface; and wherein the first storing process includes, in response to determining that the storage number is smaller than the threshold, storing the new authentication information in the storage memory.

5. The communication system according to claim 4, wherein the server-side preparing process includes:

an overwriting-confirmation instructing process of, in response to determining in the third determining process that the storage number reaches the threshold, transmitting overwriting-confirmation instructing information to the image processing apparatus through the server communication interface, the overwriting-confirmation instructing information being information of instructing confirmation of whether to perform overwriting, the overwriting being replacing the old authentication information with the new authentication information;

an overwriting confirmation information receiving process of receiving, from the image processing apparatus through the server communication interface, overwriting confirmation information indicative of whether to permit overwriting; and a fourth determining process of determining whether to permit overwriting based on the overwriting confirmation information;

wherein the server memory further stores instructions, the instructions, when executed by the server processor, causing the server to:

in response to determining that overwriting is permitted, executing the storage instructing process of transmitting the first storage instructing information to the image processing apparatus through the server communication interface; and in response to determining that overwriting is rejected, executing an error instructing process of transmitting, to the image processing apparatus through the server communication interface, error information indicating that the storage cannot store the new authentication information;

wherein the apparatus-side preparing process includes:

an overwriting-confirmation instruction receiving process of receiving the overwriting-confirmation instructing information from the server through the first communication interface; and an overwriting confirmation information transmitting process of, in response to receiving a second specifying operation of specifying whether to permit overwriting, transmitting, to the server through the first communication interface, the overwriting confirmation information specified by the second specifying operation; and wherein the first storing process includes, in response to determining that the storage number reaches the threshold and determining in the fourth determining process that overwriting is permitted, replacing the old authentication information with the new authentication information.

6. The communication system according to claim 2, wherein the image processing apparatus comprises a display;

wherein the apparatus memory further stores instructions, the instructions, when executed by the apparatus processor, causing the image processing apparatus to:

execute a display process of displaying, on the display, an authentication-information selecting screen prompting holding of the storage near the image processing apparatus, the authentication-information selecting screen including an authentication information object corresponding to the authentication information stored in the apparatus memory; and in response to detection of the storage through the second communication interface in a state where the authentication-information selecting screen is displayed on the display, execute the first receiving process, and execute the data communication process using the authentication information received from the storage in the first receiving process; and in response to receiving a selecting operation of selecting the authentication information object in the receiving process, execute the data communication process by using the authentication information stored in the apparatus memory in association with the selected authentication information object.

7. The communication system according to claim 1, wherein the server memory further stores instructions, the instructions, when executed by the server processor, causing the server to:

execute a third storing process of storing, in the server memory, the authentication information in association with identification information identifying the authentication information, the authentication information being received in the authentication-information receiving process;

wherein the apparatus-side preparing process includes an identification-information transmitting process of, in response to receiving an input operation of inputting the identification information in the receiving process, transmitting the identification information to the server through the first communication interface;

wherein the server-side preparing process includes:

an identification-information receiving process of receiving the identification information from the image processing apparatus through the server communication interface; and a fifth determining process of determining whether the server memory stores the authentication information associated with the received identification information; and wherein the server memory further stores instructions, the instructions, when executed by the server processor, causing the server to:

in response to determining in the fifth determining process that the server memory stores the authentication information, execute the storage instructing process.

8. The communication system according to claim 1, wherein the service usage process includes:

a usage-information transmitting process of transmitting service usage information to the server through the first communication interface, the service usage information being information of identifying contents of data communication with the service providing apparatus; and a communication-instructing-information receiving process of receiving communication instruction information from the server through the first communication interface, the communication instruction information being information indicative of a method of data communication with the service providing apparatus;

wherein the data communication process includes performing data communication with the service providing apparatus through the first communication interface by using the authentication information and the communication instruction information;

wherein the server memory further stores instructions, the instructions, when executed by the server processor, causing the server to execute:

a usage-information receiving process of receiving the service usage information from the image processing apparatus through the server communication interface;

a first acquiring process of acquiring the communication instruction information based on the service usage information; and a communication instructing process of transmitting the communication instruction information to the image processing apparatus through the server communication interface;

wherein the apparatus-side preparing process includes a second acquiring process of, in response to receiving a service using operation in the receiving process, acquiring the service usage information corresponding to the service using operation;

wherein the first transmitting process includes:

in response to acquiring the service usage information in the acquiring process, transmitting both of the authentication information and the service usage information to the storage through the second communication interface; and in response to not acquiring the service usage information in the acquiring process, transmitting the authentication information without transmitting the service usage information to the storage through the second communication interface;

wherein the first receiving process includes further receiving the service usage information from the storage through the second communication interface; and wherein the usage-information transmitting process includes:

in response to receiving both of the authentication information and the service usage information in the first receiving process, transmitting the service usage information received from the storage to the server through the first communication interface; and in response to receiving the authentication information without receiving the service usage information in the first receiving process, transmitting, to the server through the first communication interface, the service usage information corresponding to the service using operation received in the receiving process.

9. The communication system according to claim 1, wherein the storage is a portable memory.

10. The communication system according to claim 9, wherein the portable memory is a card.

11. The communication system according to claim 1, wherein the second communication interface is configured to perform wireless communication by using a wireless communication protocol; and wherein the storage communication interface is configured to perform wireless communication by using the wireless communication protocol.

12. The communication system according to claim 11, wherein the second communication interface is configured to perform near-field wireless communication by using a near-field wireless communication protocol; and wherein the storage communication interface is configured to perform near-field wireless communication by using the near-field wireless communication protocol.

13. A communication system comprising an image processing apparatus, a storage, a server on Internet, and a mobile terminal, the communication system being configured to receive a service from a service providing apparatus on the Internet, the mobile terminal comprising:
a first mobile communication interface;
a second mobile communication interface;
an operating interface;
a mobile processor; and
a mobile memory storing instructions, the instructions, when executed by the mobile processor, causing the mobile terminal to:
execute a receiving process of receiving a user operation through the operating interface; and
in response to receiving an instruction operation in the receiving process, execute a mobile-side preparing process including:
an issuance requesting process of transmitting issuance requesting information to the server through the first mobile communication interface and through the Internet, the issuance requesting information being information for requesting issuance of authentication information indicative of authority to perform data communication with the service providing apparatus, the instruction operation being a user operation of instructing execution of a preparing process for connecting the image processing apparatus to the service providing apparatus;
a storage-instruction receiving process of receiving storage instructing information from the server through the first mobile communication interface and through the Internet, the storage instructing information being information including the authentication information issued by the service providing apparatus; and
a first transmitting process of, in response to detection of the storage through the second mobile communication interface, transmitting the authentication information included in the storage instructing information to the storage through the second mobile communication interface;

the image processing apparatus comprising:
an image forming device configured to form an image;
a first communication interface;
a second communication interface;
an apparatus processor; and
an apparatus memory storing instructions, the instructions, when executed by the apparatus processor, causing the image processing apparatus to:
in response to detection of a storage storing the authentication information through the second communication interface, execute a service usage process including:
a first receiving process of receiving the authentication information from the storage through the second communication interface; and
a data communication process of performing data communication with the service providing apparatus through the first communication interface and through the Internet by using the authentication information, the storage comprising:
a storage communication interface;
a storage processor; and
a storage memory storing instructions, the instructions, when executed by the storage processor, causing the storage to:
in response to detection of the mobile terminal through the storage communication interface, execute a storage-side preparing process including:
a second receiving process of receiving the authentication information from the mobile terminal through the storage communication interface; and
a first storing process of storing the received authentication information in the storage memory; and
in response to determining that the authentication information is stored in the storage memory and to detection of the image processing apparatus through the storage communication interface, execute a second transmitting process of transmitting the authentication information stored in the storage memory to the image processing apparatus through the storage communication interface, the server comprising:
a server communication interface;
a server processor; and
a server memory storing instructions, the instructions, when executed by the server processor, causing the server to:
execute an issuance-request receiving process of receiving the issuance requesting information from the mobile terminal through the server communication interface and through the Internet; and
in response to receiving the issuance requesting information, execute a server-side preparing process including:
an authentication-information receiving process of receiving the authentication information from the service providing apparatus through the server communication interface and through the Internet; and a storage instructing process of transmitting the storage instructing information to the mobile terminal through the server communication interface and through the Internet.

14. An image processing apparatus configured to perform communication with a storage and a server on Internet, the image processing apparatus being configured to receive a service from a service providing apparatus on the Internet, the image processing apparatus comprising:

an image forming device configured to form an image;
a first communication interface;
a second communication interface;
an operating interface;
an apparatus processor; and
an apparatus memory storing instructions, the instructions, when executed by the apparatus processor, causing the image processing apparatus to:
  execute a receiving process of receiving a user operation through the operating interface;
  in response to receiving an instruction operation in the receiving process, execute an apparatus-side preparing process including:
    an issuance requesting process of transmitting issuance requesting information to the server through the first communication interface and through the Internet, the issuance requesting information being information for requesting issuance of authentication information indicative of authority to perform data communication with the service providing apparatus, the instruction operation being a user operation of instructing execution of a preparing process for connecting the image processing apparatus to the service providing apparatus;
    a storage-instruction receiving process of receiving storage instructing information from the server through the first communication interface and through the Internet, the storage instructing information being information including the authentication information issued by the service providing apparatus; and
    a first transmitting process of, in response to detection of the storage through the second communication interface, transmitting the authentication information included in the storage instructing information to the storage through the second communication interface;
  in response to detection of a storage storing the authentication information through the second communication interface, execute a service usage process including:
    a first receiving process of receiving the authentication information from the storage through the second communication interface; and
    a data communication process of performing data communication with the service providing apparatus through the first communication interface and through the Internet by using the authentication information.

15. The image processing apparatus according to claim 14, wherein the apparatus-side preparing process includes:
a storage-location specifying process of, in response to receiving a first specifying operation of specifying a storage location of the authentication information in the receiving process, transmitting, to the server through the first communication interface, storage-location specifying information indicative of the storage location specified by the first specifying operation; and
wherein the apparatus memory further stores instructions, the instructions, when executed by the apparatus processor, causing the image processing apparatus to:
  in response to receiving first storage instructing information in the storage-instruction receiving process, execute the first transmitting process, the first storage instructing information including the authentication information, the first storage instructing information being the storage instructing information of instructing storing the authentication information in the storage; and
  in response to receiving second storage instructing information in the storage-instruction receiving process, execute a second storing process of storing the authentication information included in the second storage instructing information in the apparatus memory, the second storage instructing information including the authentication information, the second storage instructing information being the storage instructing information of instructing storing the authentication information in the image processing apparatus.

16. The image processing apparatus according to claim 15, wherein the apparatus-side preparing process includes:
a storage-information acquisition instruction receiving process of receiving storage-information acquisition instructing information from the server through the first communication interface, the storage-information acquisition instructing information being information of instructing acquisition of type information indicative of whether the storage is configured to store the authentication information;
a third receiving process of, in response to detection of the storage through the second communication interface, receiving the type information from the storage through the second communication interface; and
a storage-information transmitting process of transmitting the type information to the server through the first communication interface.

17. The image processing apparatus according to claim 15, wherein the apparatus-side preparing process includes:
a storage-information acquisition instruction receiving process of receiving storage-information acquisition instructing information from the server through the first communication interface, the storage-information acquisition instructing information being information of instructing acquisition of storage-number information indicative of a number of the authentication information already stored in the storage;
a third receiving process of, in response to detection of the storage through the second communication interface, receiving the storage-number information from the storage through the second communication interface; and
a storage-information transmitting process of transmitting the storage-number information to the server through the first communication interface.

18. The image processing apparatus according to claim 17, wherein the apparatus-side preparing process includes:
an overwriting-confirmation instruction receiving process of receiving overwriting-confirmation instructing information from the server through the first communication interface, the overwriting-confirmation instructing information being information of instructing confirmation of whether to perform overwriting, the overwriting being replacing the old authentication information with the new authentication information; and an overwriting confirmation information transmitting process of, in response to receiving a second specifying operation of specifying whether to permit overwriting, transmitting, to the server through the first communication interface, overwriting confirmation information specified by the second specifying operation, the overwriting confirmation information being indicative of whether to permit overwriting.

19. The image processing apparatus according to claim 15, further comprising a display,
wherein the apparatus memory further stores instructions, the instructions, when executed by the apparatus processor, causing the image processing apparatus to:
execute a display process of displaying, on the display, an authentication-information selecting screen prompting holding of the storage near the image processing apparatus, the authentication-information selecting screen including an authentication information object corresponding to the authentication information stored in the apparatus memory; and
wherein the apparatus memory further stores instructions, the instructions, when executed by the apparatus processor, causing the image processing apparatus to:
in response to detection of the storage through the second communication interface of the image processing apparatus that is displaying the authentication-information selecting screen, execute the first receiving process, and execute the data communication process using the authentication information received from the storage in the first receiving process; and
in response to receiving a selecting operation of selecting the authentication information object in the receiving process, execute the data communication process by using the authentication information stored in the apparatus memory in association with the selected authentication information object.

20. A server configured to execute a preparing process of allowing the image processing apparatus to receive a service provided by a service providing apparatus on Internet, the server comprising:
a server communication interface;
a server processor; and
a server memory storing instructions, the instructions, when executed by the server processor, causing the server to:
execute an issuance-request receiving process of receiving an issuance requesting information from an external apparatus through the server communication interface and through the Internet, the issuance requesting information being information for requesting issuance of authentication information indicative of authority to perform data communication with the service providing apparatus; and
in response to receiving the issuance requesting information, execute a server-side preparing process including:
an authentication-information receiving process of receiving the authentication information issued by the service providing apparatus from the service providing apparatus through the server communication interface and through the Internet;
a first determining process of determining a first condition of whether the external apparatus is configured to perform communication compatible with a communication protocol and a second condition of whether the external apparatus is other than the image processing apparatus; and
a storage instructing process of, in response to determining in the first determining process that both of the first condition and the second condition are positive, transmitting first storage instructing information to the image processing apparatus through the server communication interface and through the Internet, the first storage instructing information including the authentication information issued by the service providing apparatus, the first storage instructing information being storage instructing information of instructing transmitting the authentication information to a storage for storing the authentication information in the storage.

21. The server according to claim 20, wherein the server-side preparing process includes a second determining process of, in response to determining in the first determining process that at least one of the first condition and the second condition is negative, determining whether the external apparatus is the image processing apparatus; and
wherein the storage instructing process includes, in response to determining in the second determining process that the external apparatus is the image processing apparatus, transmitting second storage instructing information to the image processing apparatus through the server communication interface, the second storage instructing information including the authentication information, the second storage instructing information being the storage instructing information of instructing storing the authentication information in the image processing apparatus.

22. The server according to claim 21, wherein the server-side preparing process includes:
a generating process of, in response to determining in the second determining process that the external apparatus is not the image processing apparatus, generating identification information that identifies the authentication information received in the authentication-information receiving process;
a storing process of storing, in the server memory, the authentication information and the identification information in association with each other; and
an identification-information transmitting process of transmitting the identification information to the external apparatus through the server communication interface.

23. A non-transitory computer-readable storage medium storing instructions readable by a mobile terminal, the mobile terminal being configured to perform communication with a storage and a server on Internet and configured to allow an image processing apparatus to receive a service provided by a service providing apparatus on the Internet, the mobile terminal having a first mobile communication interface, a second mobile communication interface, an operating interface, and a processor, the instructions, when executed by the processor, causing the mobile terminal to:
execute a receiving process of receiving a user operation through the operating interface; and
in response to receiving an instruction operation in the receiving process, execute a mobile-side preparing process including:

an issuance requesting process of transmitting issuance requesting information to the server through the first mobile communication interface and through the Internet, the issuance requesting information being information for requesting issuance of authentication information indicative of authority to perform data communication with the service providing apparatus, the instruction operation being a user operation of instructing execution of a preparing process for connecting the image processing apparatus to the service providing apparatus;

a storage-instruction receiving process of receiving storage instructing information from the server through the first mobile communication interface and through the Internet, the storage instructing information being information including the authentication information issued by the service providing apparatus; and a first transmitting process of, in response to detection of the storage through the second mobile communication interface, transmitting the authentication information included in the storage instructing information to the storage through the second mobile communication interface.

* * * * *